US009608830B2

(12) United States Patent
Perez Martinez et al.

(10) Patent No.: US 9,608,830 B2
(45) Date of Patent: Mar. 28, 2017

(54) POLICY AND CHARGING CONTROL METHODS FOR HANDLING MULTIPLE-USER SUBSCRIPTIONS OF A TELECOMMUNICATION NETWORK

(75) Inventors: Alfonso de Jesus Perez Martinez, Madrid (ES); Rodrigo Alvarez Dominguez, Madrid (ES); Juan Ignacio Perez Andres, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 14/410,494

(22) PCT Filed: Jul. 5, 2012

(86) PCT No.: PCT/EP2012/063113
§ 371 (c)(1),
(2), (4) Date: Dec. 22, 2014

(87) PCT Pub. No.: WO2014/005636
PCT Pub. Date: Jan. 9, 2014

(65) Prior Publication Data
US 2015/0131488 A1 May 14, 2015

(51) Int. Cl.
*H04L 12/14* (2006.01)
*H04L 12/24* (2006.01)
(Continued)

(52) U.S. Cl.
CPC ........ *H04L 12/1407* (2013.01); *G06F 21/604* (2013.01); *G06F 21/629* (2013.01);
(Continued)

(58) Field of Classification Search
CPC ................. G06F 21/604; G06F 21/629; G06F 2221/2117; G06F 2221/2141;
(Continued)

(56) References Cited

U.S. PATENT DOCUMENTS 8,499,324 B1 * 7/2013 Mitchell ............ H04B 7/18508
709/219
8,949,928 B2 * 2/2015 Perez Martinez ...... G06F 17/00
726/1

(Continued)

FOREIGN PATENT DOCUMENTS

EP          1 376 981       1/2004
WO      WO 2011/144156      11/2011

OTHER PUBLICATIONS

International Search Report for International application No. PCT/EP2012/063113, Oct. 26, 2012.
(Continued)

*Primary Examiner* — Chi H Pham
*Assistant Examiner* — Robert Lopata
(74) *Attorney, Agent, or Firm* — Baker Botts, LLP

(57) ABSTRACT

A policy and charging control method enables a privileged user of a multiple-user subscription of a telecommunication network to cause a change to a policy or charging applicable to a non-privileged user of the subscription. The method comprises: (i) accessing (s10), by a communication terminal of the non-privileged user, an authorization control manager (ACM) function, to request a change of policy or charging applicable to the non-privileged user; (ii) transmitting (s20), by the ACM function to a PCRF, the requested change; (iii) notifying (s30) a communication terminal of the privileged user, by the PCRF, of the requested change; and (iv) indicating (s40), by the communication terminal of the privileged user, to the ACM function, at least one of: (a) whether the requested change is approved, and (b) to which extent the requested change is approved. The invention also relates to network nodes, computer programs, and computer program products.

22 Claims, 15 Drawing Sheets

(51) Int. Cl.
*G06F 21/60* (2013.01)
*G06F 21/62* (2013.01)
*H04M 15/00* (2006.01)
*H04W 12/08* (2009.01)

(52) U.S. Cl.
CPC ...... *H04L 41/0893* (2013.01); *H04L 41/5025* (2013.01); *H04M 15/43* (2013.01); *H04M 15/46* (2013.01); *H04M 15/66* (2013.01); *H04M 15/70* (2013.01); *H04M 15/72* (2013.01); *H04M 15/77* (2013.01); *H04W 12/08* (2013.01); *G06F 2221/2117* (2013.01); *G06F 2221/2141* (2013.01); *G06F 2221/2149* (2013.01)

(58) Field of Classification Search
CPC ......... G06F 2221/2149; H04L 12/1407; H04L 41/0893; H04L 41/5025; H04M 15/43; H04M 15/46; H04M 15/66; H04M 15/70; H04M 15/72; H04M 15/77; H04W 12/08
USPC ........................................................ 370/259
See application file for complete search history.

(56) References Cited

U.S. PATENT DOCUMENTS

| | | | | |
|---|---|---|---|---|
| 2003/0041155 | A1* | 2/2003 | Nelson | H04B 7/18506 709/230 |
| 2005/0077424 | A1* | 4/2005 | Schneider | F41G 7/303 244/3.11 |
| 2006/0030311 | A1* | 2/2006 | Cruz | H01Q 1/246 455/431 |
| 2007/0180100 | A1 | 8/2007 | Biggs et al. | |
| 2008/0240029 | A1* | 10/2008 | Lynch | H04B 7/18508 370/329 |
| 2009/0096857 | A1* | 4/2009 | Frisco | H04B 7/18508 348/14.02 |
| 2010/0146596 | A1* | 6/2010 | Stenfelt | H04L 63/102 726/4 |
| 2012/0081557 | A1* | 4/2012 | Kupinsky | H04L 12/1407 348/207.1 |
| 2012/0290452 | A1* | 11/2012 | Pancorbo Marcos | H04L 12/1407 705/30 |
| 2012/0320801 | A1* | 12/2012 | Yang | H04L 12/14 370/259 |
| 2012/0331516 | A1* | 12/2012 | Perez Martinez | H04L 63/0245 726/1 |
| 2013/0305330 | A1* | 11/2013 | Palanigounder | H04L 63/062 726/6 |
| 2013/0325700 | A1* | 12/2013 | Chakraborty | H04W 12/08 705/39 |
| 2014/0087775 | A1* | 3/2014 | Wang | H04L 12/1407 455/466 |
| 2014/0156844 | A1* | 6/2014 | Cavgalar | H04L 65/102 709/225 |
| 2014/0237129 | A1* | 8/2014 | Castro Castro | H04L 12/14 709/228 |
| 2014/0282684 | A1* | 9/2014 | Keen | H04N 21/2146 725/30 |
| 2014/0282727 | A1* | 9/2014 | Keen | H04N 21/4222 725/37 |

OTHER PUBLICATIONS

Universal Mobile Telecommunications System (UMTS); LTE; Policy and charging control over Gx reference point (3GPP TS 29.212 version 9.2.0 Release 9), 2010.

Universal Mobile Telecommunications System (UMTS); LTE; IP Multimedia Subsystem (IMS) based Packet Switch Streaming (PSS) and Multimedia Broadcast/Multicast Service (MBMS) User Service; Protocols (3GPP TS 26.237 version 10.4.0 Release 10), 2012.

PCT Notification of Transmittal of the International Search Report and the Written Opinion of the International Searching Authority, or the Declaration for International application No. PCT/EP2012/063113, Oct. 26, 2012.

* cited by examiner

POLICY AND CHARGING CONTROL METHODS FOR HANDLING MULTIPLE-USER SUBSCRIPTIONS OF A TELECOMMUNICATION NETWORK

PRIORITY

This nonprovisional application is a U.S. National Stage Filing under 35 U.S.C. §371 of International Patent Application Serial No. PCT/EP2012/063113, filed Jul. 5, 2012 and entitled "Policy and Charging Control Methods for Handling Multiple-User Subscriptions of a Telecommunication Network."

TECHNICAL FIELD

The present invention relates to policy and charging control (PCC) methods for assisting in handling multiple-user subscriptions of a telecommunication network. The invention also relates to network nodes, such as for instance network nodes hosting a policy and charging rules function (PCRF) and network nodes hosting a policy and charging enforcement function (PCEF). The invention also relates to computer program products and computer programs comprising computer-executable instructions configured for implementing the above-mentioned methods on network nodes.

BACKGROUND

In communication networks, such as telecommunication networks, a call or a service often involves, on the one hand, a control plane or signalling plane and, on the other hand, a user plane or media plane. The control plane or signalling plane is in charge of establishing and managing a connection between two points on the network. The user plane or media plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber, i.e. the user, is entitled, or authorized, to enjoy a service, and whether the network can provide the service to the subscriber (and, possibly, with which quality of service).

Policy and charging control (PCC) architectures, such as, but not limited to, the architecture described in "3GPP TS 23.203 V9.11.0 (2012-03); Technical Specification; 3rd Generation Partnership Project; Technical Specification Group Services and System Aspects; Policy and charging control architecture (Release 9)" (available on http://www.3gpp.org/ftp/Specs/html-info/23203.htm), integrate the policy and charging control.

In such a FCC architecture, the PCRF is a functional entity in charge of deciding charging, policies and quality of service (QoS) for services of a given user. The PCRF may for instance decide the quality of the connection to be allocated for voice, video, etc, which results, for example, on the establishment of dedicated bearer(s) with guaranteed bit rate (GBR) or non-guaranteed bit rate (non GBR). The PCRF may also make decisions about packet forwarding treatment in the radio access network (RAN) by means of determining the QoS class identifier (QCI). The PCRF may also decide, at the packet core control plane, the priority of a bearer to be established over other bearers, for the same or different users, by providing allocation and retention priority (ARP) information. Based on the above decisions by the PCRF, PCC rules may be generated and installed in a PCEF of the PCC architecture, so that each service is given the appropriate treatment that the service requires.

In telecommunications networks, a multiple-user subscription is a shared subscription involving more than one user. A multiple-user subscription in this context comprises at least one user who is privileged compared to the other users of the subscription, hereinafter referred to as non-privileged users, in the sense that the privileged user has the authority to decide which services the non-privileged users may access and/or the conditions under which the non-privileged users may access such services.

It is desirable to provide methods and apparatuses to improve PCC architectures and implementations, notably to efficiently handle multiple-user subscriptions, without increasing, or at least without excessively increasing, the implementation and architecture complexity and the associated equipment costs.

SUMMARY

To meet or at least partially meet the above-mentioned goals, methods, network nodes, computer programs and computer program products according to the invention are defined in the independent claims. Particular embodiments are defined in the dependent claims.

In one embodiment, a PCC method is provided for enabling a privileged user of a multiple-user subscription of a telecommunication network to cause a change to a policy or charging applicable to a non-privileged user of the multiple-user subscription. The method comprises: (i) accessing, by a communication terminal of the non-privileged user, an authorization control manager (ACM) function, to request a change of policy or charging applicable to the non-privileged user; (ii) transmitting, by the ACM function to a PCRF, the requested change; (iii) notifying a communication terminal of the privileged user, by the PCRF, of the requested change; and (iv) indicating, by the communication terminal of the privileged user, to the ACM function, at least one of: (a) whether the requested change is to be granted (or, in other words, whether the requested change is approved), and (b) to which extent the requested change is to be granted (or, in other words, to which extent the requested change is approved).

The method enables a more efficient and quicker authorization process for enabling a privileged user of a multiple-user subscription to change, or to approve a requested change to, the policy and charging applicable to a non-privileged user of the multiple-user subscription. This may for instance imply, after the access to a service has been denied—by the PCEF—to a non-privileged user, authorizing by the privileged user such an access and thereafter changing the PCC rules accordingly. This is achieved by the provision of the ACM function which is at least arranged, as explained above, firstly to be accessed by a communication terminal of a non-privileged user so that the non-privileged user can request a policy change, secondly to communicate the requested change to a PCRF, and, thirdly, to receive an indication from a communication terminal of a privileged user as to whether the requested change is approved and/or to which extent the requested change is approved.

In one embodiment, the method further comprises, before the step of accessing: a step of determining, by a PCEF, that the communication terminal of the non-privileged user is attempting to access a service or content which, if provided, would violate the policy or charging applicable to the non-privileged user.

In this embodiment, the PCEF initiates the policy change approval process when it detects that the communication terminal of the non-privileged user is acting in a manner indicating a potential need for a change to the policies that the PCEF currently enforces on the services provided to the communication terminal of the non-privileged user. The PCEF initiates the policy change approval process by causing, proposing to, redirecting, or inviting, the communication terminal of the non-privileged user to access the ACM function to request a policy change. The communication terminal of the non-privileged user then requests the policy change, if wished.

The above-mentioned step of determining may comprise, in one embodiment, determining that the communication terminal of the non-privileged user is attempting to access web content or a service which the non-privileged user is not allowed to access according to the current policies enforced by the PCEF against the non-privileged user communications.

The above-mentioned step of determining may, additionally or alternatively, comprise, in one embodiment, determining that the non-privileged user has insufficient credit to access the service or content. In other words, the access may occur while the non-privileged user has exhausted all the credit (time, money, bandwidth, or the like) that had been originally made available to him/her on in his/her account within the multiple-user subscription.

In one embodiment, the above-mentioned step of determining comprises inspecting at least one of (a) layer n control information of received packets, wherein n is an integer equal to or larger than 3; and (b) received packets' payload encapsulated by layer 7 control information; wherein the layer level is understood in the sense of the Open Systems Interconnection (OSI) reference model. In other words, in this embodiment, the PCEF performs deep packet inspection (DPI) to detect whether, for instance, a requested uniform resource locator (URL) referred to in a request sent by a non-privileged user corresponds to an Internet resource that the non-privileged user is not currently allowed to access.

In one embodiment, the step of accessing is triggered by the PCEF redirecting the browser of the communication terminal of the non-privileged user to a URL address of the ACM function. Such a redirection, for instance based on the Hypertext Transfer Protocol (HTTP) protocol, is a convenient way to offer the chance to the communication terminal of the non-privileged user to easily and quickly request a policy change.

In one embodiment, the step of accessing is followed by the ACM function identifying the privileged user who should handle the requested change. In one embodiment, the step of accessing comprises selecting, by the communication terminal of the non-privileged user, the privileged user who should handle the requested change; and the step of accessing is followed by the ACM function identifying the privileged user who should handle the requested change depending on which privileged user has been selected by the communication terminal of the non-privileged user.

In one embodiment, the method further comprises, before the step of accessing: (i) generating, by the PCRF, first PCC rules based on session information negotiated between the non-privileged user's communication terminal and an application function (AF), the PCC rules indicating that they apply to a non-privileged user of the multiple-user subscription; (ii) installing, at establishment or modification of a user plane session associated with the non-privileged user's communication terminal, the first PCC rules at a PCEF; and (iii) initiating a service associated with the non-privileged user's communication terminal in accordance with the first PCC rules. In this embodiment, after these three steps of generating, installing, and initiating take place, the PCEF may determine, at one point in time, that the communication terminal of the non-privileged user is attempting to access a service or content which, if provided, would violate the first PCC rules, i.e. the policy and/or charging control rules currently applicable to the non-privileged user. In such a case, the PCEF may therefore initiate the policy change request process by inviting, redirecting, or forcing the non-privileged user's communication terminal to access the ACM function, as described above.

In this embodiment, the method may further comprise, after the step of indicating (as described above, i.e. indicating, by the privileged user's communication terminal, to the ACM function, whether the requested change is approved, and/or to which extent the requested change is approved): (a) generating, by the PCRF, second PCC rules based on the indication received by the ACM function from the communication terminal of the privileged user; (b) installing, at the PCEF, the second PCC rules by replacing the first PCC rules by the second PCC rules; and (c) resuming the service for the non-privileged user's communication terminal in accordance with the second PCC rules. This provides a practical and technically efficient way to apply and enforce PCC rules in accordance with the indication provided by the communication terminal of the privileged user. In this embodiment, the steps of accessing, transmitting, notifying, indicating, generating, installing, and resuming, as described above, may take place during the lifetime of the user plane session.

In one embodiment, the ACM function is hosted on a network node hosting a subscriber profile repository (SPR). The SPR may notably store information regarding which users belong to which multiple-user subscriptions, and whether a user of the multiple-user subscription is a privileged or non-privileged user of the multiple-user subscription. In other words, the SPR may store the parameters defining a multiple-user subscription. The network node hosting the SPR is particularly suited to host the ACM function, since the SPR is already hosting subscription information regarding the subscribers. Nevertheless, in other embodiments, the ACM function may be executed in a standalone node or in any other node, including PCRF and PCEF, inasmuch as such a standalone node or other node can access to subscription information as stored in the SPR.

The invention also relates to network nodes, implemented for instance as programmed computers or sets of programmed computers.

In one embodiment, a network node hosts an ACM function configured for participating in enabling a privileged user of a multiple-user subscription of a telecommunication network to cause a change to a policy or charging applicable to a non-privileged user of the multiple-user subscription. The network node hosting the ACM function comprises: (i) a first unit, hereinafter referred to as access unit, configured for enabling a communication terminal of the non-privileged user to access the ACM function to request a change of policy or charging applicable to the non-privileged user; (ii) a second unit, hereinafter referred to as sending unit, configured for sending, to a PCRF, the requested change; and (iii) a third unit, hereinafter referred to as indication unit, configured for enabling a communication terminal of the privileged user to indicate, to the ACM function, at least one of: (a) whether the requested change is to be granted, and (b) to which extent the requested change is to be granted.

In one embodiment, a network node hosts a PCRF configured for participating in enabling a privileged user of a multiple-user subscription of a telecommunication network to cause a change to a policy or charging applicable to a non-privileged user of the multiple-user subscription. The network node hosting the PCRF comprises: (i) a first unit, hereinafter referred to as receiving unit, configured for receiving, from an ACM function, a requested change of policy or charging applicable to the non-privileged user; and (ii) a second unit, hereinafter referred to as notifying unit, configured for notifying a communication terminal of the privileged user of the requested change.

In one embodiment, a network node hosts a PCEF configured for participating in enabling a privileged user of a multiple-user subscription of a telecommunication network to cause a change to a policy or charging applicable to a non-privileged user of the multiple-user subscription. The network node hosting the PCEF comprises: (i) a first unit, hereinafter referred to as determining unit, configured for determining that the communication terminal of the non-privileged user is attempting to access a service or content which, if provided, would violate the policy or charging applicable to the non-privileged user; and (ii) a second unit, hereinafter referred to as redirecting unit, configured for, when the determining unit has determined that the communication terminal of the non-privileged user is attempting to access a service or content which, if provided, would violate the policy or charging applicable to the non-privileged user, redirecting the browser of the non-privileged user's communication terminal to a URL address of an ACM function, as described above.

The invention also relates to computer program products and computer programs comprising computer-executable instructions configured, when executed on a network node or computer, to cause the network node or computer to participate in a method according to any one of the above-described embodiments, or to implement the functions of a network node according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
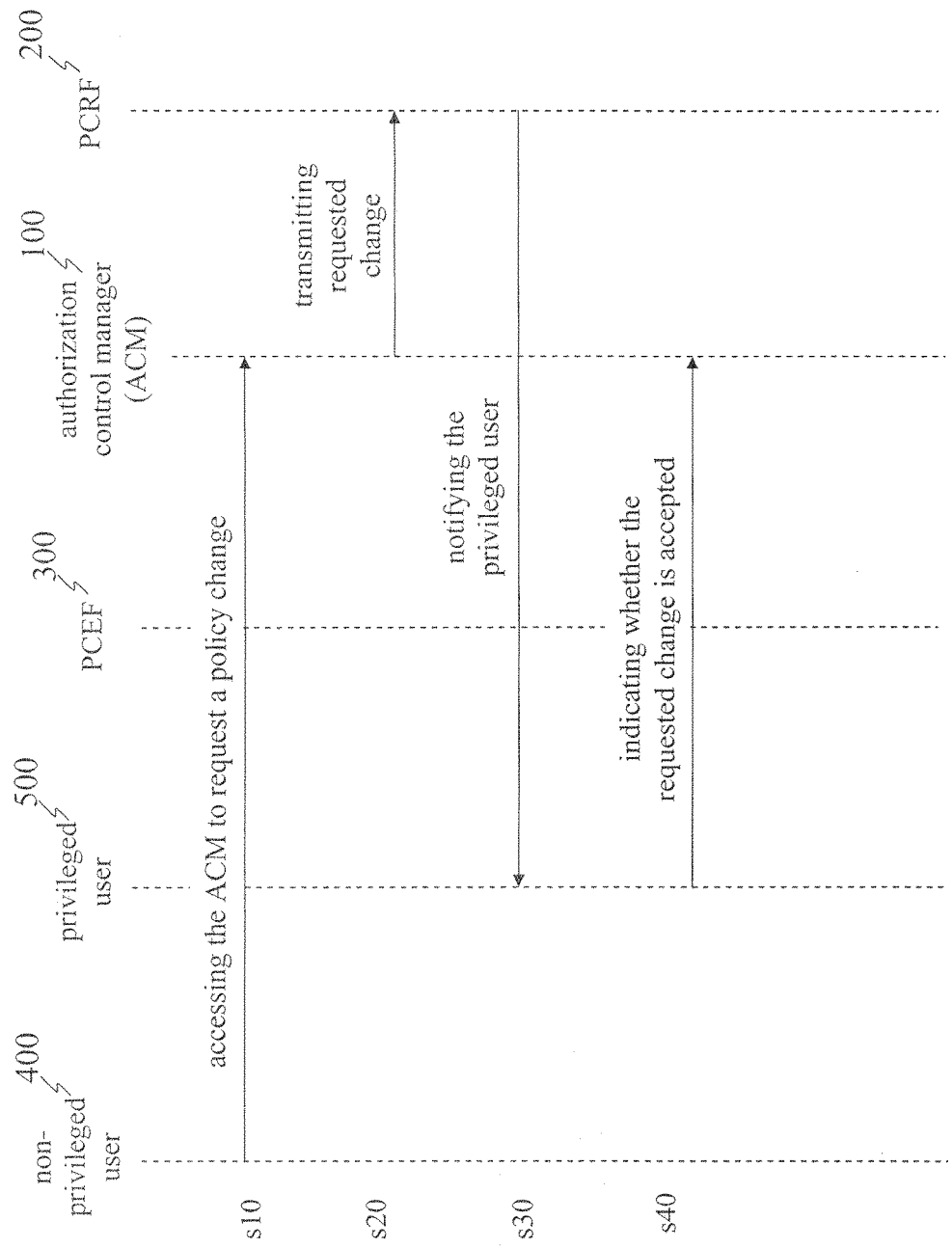
FIG. 1 is a message sequence chart illustrating a method in one embodiment of the invention.

FIG. 1 is a message sequence chart illustrating the exchange of messages between entities in a method according to one embodiment of the invention. The method illustrated in FIG. 1 involves a communication terminal 400 of a non-privileged user (labelled on FIG. 1 simply as "non-privileged user"), a communication terminal 500 of a privileged user (labelled as "privileged user"), a network node 300 hosting a PCEF (labelled as "PCEF"), a network node 100 hosting an ACM function (labelled as "authorization control manager (ACM)"), and a network node 200 hosting a PCRF (labelled as "PCRF"). The privileged user and non-privileged user belong to a common multiple-user subscription of a telecommunication network. Communication terminal 400 of the non-privileged user and communication terminal 500 of the privileged user may be any type of communication terminal such as, for instance, mobile phones, smartphones, laptops, desktop computers, tablet PCs, gaming devices, etc. Moreover, communication terminal 400 of the non-privileged user and communication terminal 500 of the privileged user need not be of the same type.

The method illustrated in FIG. 1 involves the following steps.

Figure 3:
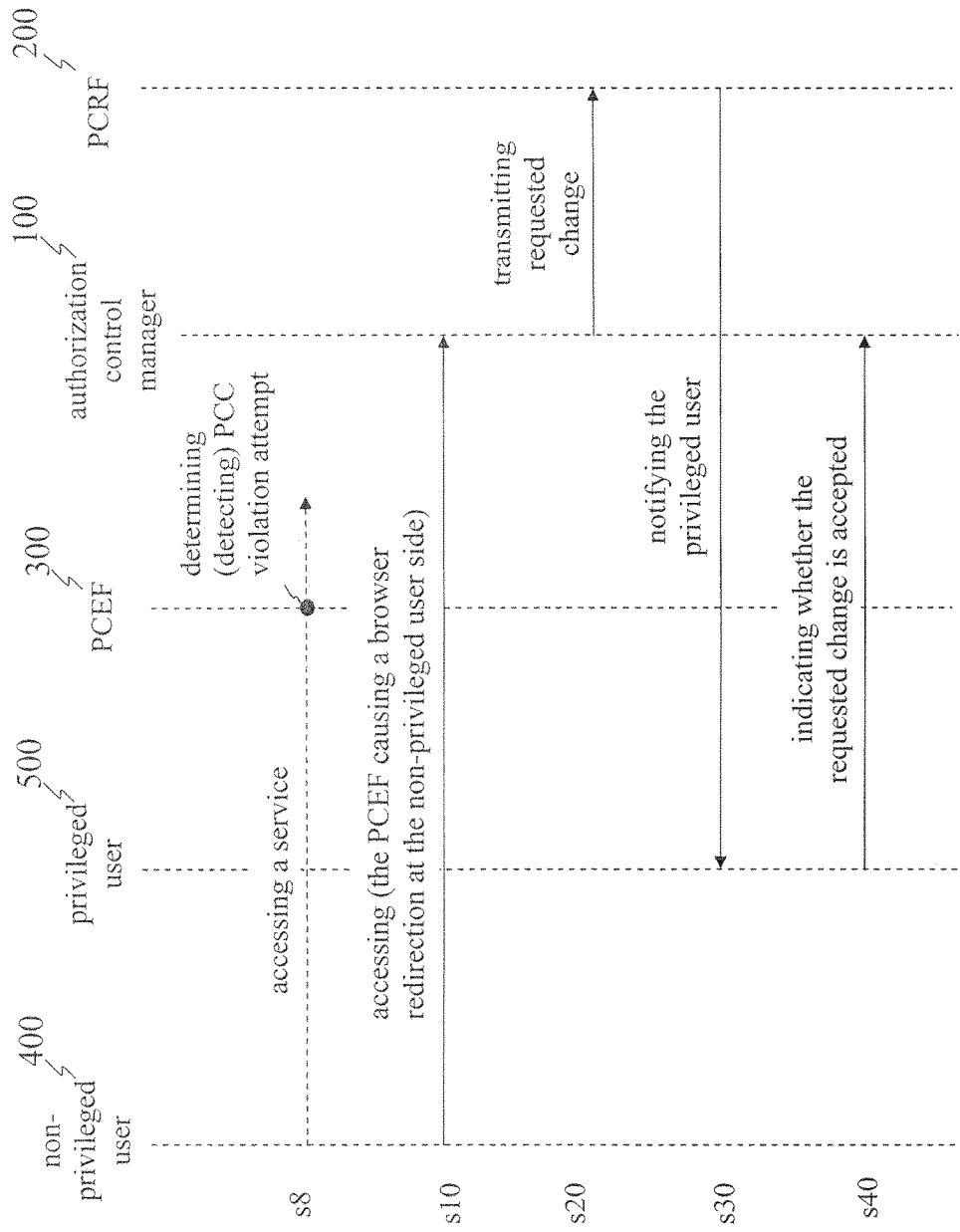
FIG. 3 is a message sequence chart illustrating a method in one embodiment of the invention, wherein a PCEF detects a non-allowed access attempt and thereafter redirects the non-privileged user's communication terminal browser towards the ACM function.

In step s10 (as illustrated by the arrow labelled "accessing the ACM to request a policy change"), communication terminal 400 of the non-privileged user accesses ACM function 100 to request a change of policy or charging applicable to the non-privileged user. This access s10 may for instance comprise a step of accessing, using a browser, a web server of ACM function 100. The step of accessing may be a forced access, such as by browser redirection as illustrated by FIG. 3, or, alternatively, non-privileged users may have to access ACM function 100 by carrying out a user interface operation (for example leading to opening an HTTP connection towards ACM function 100).

Then, in step s20 (as illustrated by the arrow labelled "transmitting requested change"), ACM function 100 transmits to PCRF 200 the requested change. Step s20 may for instance comprise transmitting a Lightweight Directory Access Protocol (LDAP) message from ACM function 100 to PCRF 200.

In step s30 (as illustrated by the arrow labelled "notifying the privileged user"), PCRF 200 notifies a communication terminal 500 of the privileged user that a requested change has been generated for the non-privileged user. The notification s30 may for instance comprise sending a short message service (SMS) or HTTP message from PCRF 200 to the privileged user's communication terminal 500.

In step s40 (as illustrated by the arrow labelled "indicating whether the requested change is accepted"), the communication terminal 500 of the privileged user indicates, to ACM function 100, whether the requested change is to be granted and/or to which extent the requested change is to be granted. Optionally, at that point, the non-privileged user may be notified of the privileged user's decision.

This therefore enables the privileged user of the multiple-user subscription to accept a requested change to a policy or charging applicable to a non-privileged user and to therefore cause a change to a policy or charging applicable to this non-privileged user. Indeed, once ACM function 100 receives the indication in step s40, and provided that the indication corresponds to the approval of the requested change, ACM function 100 causes the rules that are stored and enforced in the PCC architecture in relation to the non-privileged subscriber to be updated (not illustrated on FIG. 1). In particular, the rules enforced in PCEF 300 are updated. ACM function 100 should preferably trigger this update without delay so that the non-privileged user may immediately benefit from the change in policy and/or charging that has been approved by the privileged user. In one embodiment, this means that, following a positive indication received in step s40, ACM function 100 triggers the update of rules applicable to the non-privileged user to be completed. In one embodiment, this means that, following a positive indication received in step s40, ACM function 100 triggers the update of rules applicable to the non-privileged user to be completed as soon as possible.

Although FIG. 1 schematically illustrates five entities, more entities may be involved. For example, more than one privileged user may exist in a multiple-user subscription, more than one non-privileged user may exist in a multiple-user subscription, and each or some of the users may use more than one communication terminals. In a further example, the ACM function part with which the non-privileged users interact may be hosted on one network node, such as for instance a network node hosting the PCEF, whereas the ACM function part with which the privileged users interact may be hosted on another network node, such as for instance a network node hosting the PCRF. Thus, the ACM function may be split on two nodes, this however implying that information has to be synchronized between the two network nodes. In contrast, hosting the ACM function on one network node is more advantageous because, in such a case, the subscription information is put together.

The step of accessing s10 may be followed by the ACM function 100 identifying the privileged user who should handle (i.e., approve or disapprove) the requested change (not illustrated on FIG. 1). In one embodiment, ACM function 100 may find out, or decide, on its own the relevant or appropriate privileged user who should handle the requested change. If, for instance, there is only one privileged user for the multiple-user subscription at stake, ACM function 100 can find this out without any difficulty, provided that the information is readily available to ACM function 100, which should preferably be the case. Alternatively, in another embodiment, ACM function 100 may rely on information provided in that respect by the non-privileged user's communication terminal 400. For example, when accessing ACM function 100 in step s10, the non-privileged user's communication terminal 400 may select the privileged user who should, or should preferably, handle the requested change. This information is passed on to ACM function 100, which may then use it when transmitting s20 the requested change to PCRF 200. This is especially interesting for example for a parental control scenario wherein more than one privileged users exist.

Optionally (non-illustrated on FIG. 1), the non-privileged user may, after step s40, be notified regarding what the privileged user has decided through the ACM function 100 in step s40.

Figure 2:
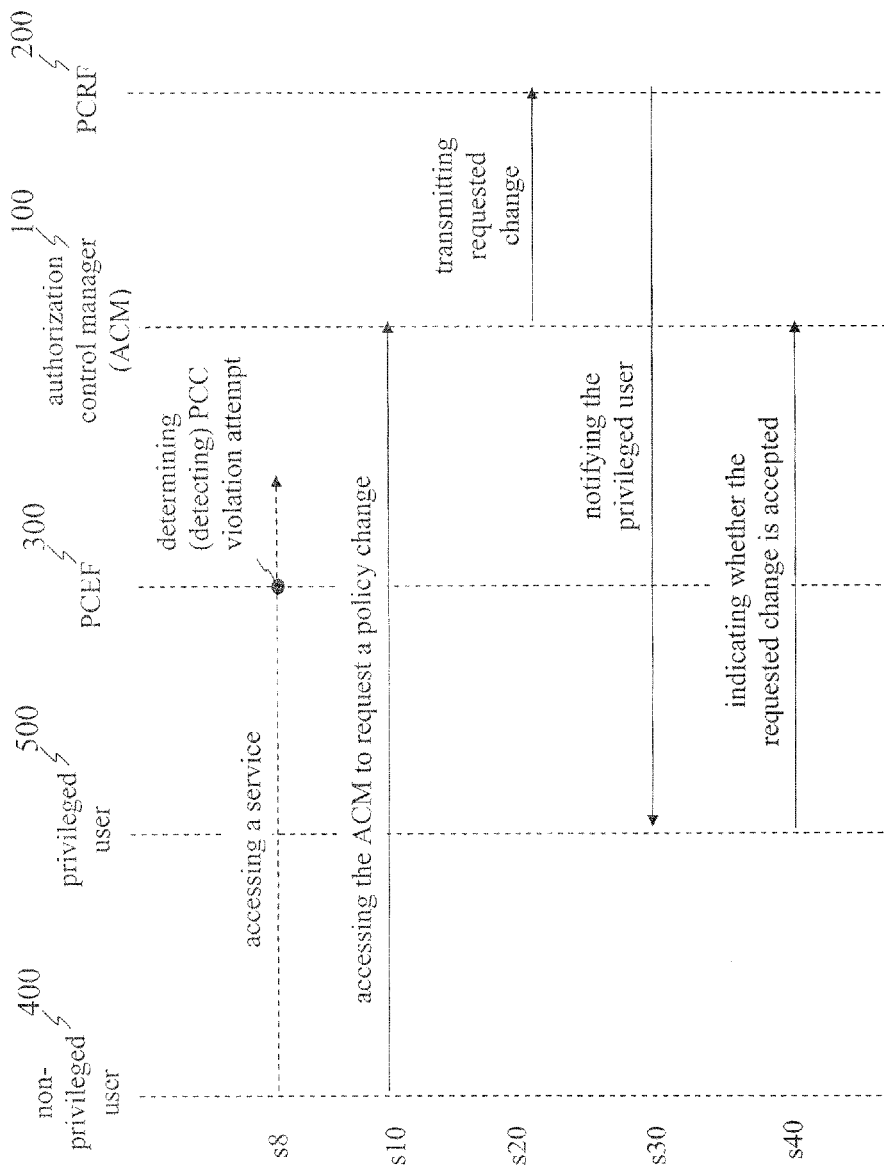
FIG. 2 is a message sequence chart illustrating a method in one embodiment of the invention, wherein a PCEF detects a non-allowed access attempt and thereafter causes, redirects, or invites, the communication terminal of the non-privileged user to access an ACM function.

FIG. 2 is a message sequence chart illustrating a method in one embodiment of the invention, which differs from the method illustrated in FIG. 1 as follows. Before the step of accessing, PCEF 300 determines, in step s8 (as illustrated by the arrow labelled "accessing a service" and the words "determining (detecting) PCC violation attempt") that the non-privileged user's communication terminal 400 is attempting to access a service or content which, if such access were provided by the PCEF 300 to the non-privileged user, would violate the current policy or charging applicable to the non-privileged user. PCEF 300 then causes, redirects, or proposes to, the non-privileged user's communication terminal 400 to access ACM function 100, in order to request a change of policy or charging applicable to the non-privileged user. In such a manner, as soon as necessary, the non-privileged user may efficiently generate a change request to be handled and approved by a privileged user.

The determination that the non-privileged user's communication terminal 400 is attempting to access a service or content which, if provided by the PCEF 300, would violate the current policy or charging applicable to the non-privileged user may notably comprise: (i) determining that the non-privileged user's communication terminal 400 is attempting to access web content or service which is not available for access according to the policy currently applicable to the non-privileged user; and/or (ii) determining that the non-privileged user has insufficient credit to access the service or content.

The determination in step s8 may involve deep packet inspection (DPI) carried out by PCEF 300. DPI technology, which may be embedded in PCEF, supports packet inspection and service classification, whereby packets, such as for example Internet Protocol (IP) packets, are classified according to a configured tree of rules so that they are assigned to a particular service session. DPI technology may be also provided in a standalone network node, such as a node hosting the so-called Traffic Detection Function defined by 3GPP TS 23.203 (already referred to above), as an element of the PCC architecture. Packet inspection technology offers two types of analysis, namely shallow packet inspection and deep packet inspection (DPI). Shallow packet inspection extracts basic protocol information, such as IP addresses (source, destination) and other low-level connection states. This extracted information resides in the packet header itself and consequently reveals the principal communication intent. DPI, on the other hand, provides application awareness. This is achieved by analysing the content in both the packet header and the payload over a series of packet transactions. There are several possible methods of analysis used to identify and classify applications and/or protocols that are grouped into signatures. One of these methods deals with heuristic signatures which are related to the behavioural analysis of user traffic.

FIG. 3 is a message sequence chart illustrating a method in one embodiment of the invention, which differs from the method illustrated in FIG. 2 as follows. Once PCEF 300 determined, in step s8, that the non-privileged user's communication terminal 400 is attempting to access a service or content which is not allowed (as explained above with reference to FIG. 2), PCEF 300 causes the browser of the non-privileged user's communication terminal 400 to be redirected towards ACM function 100 (step s10 is illustrated by the arrow now labelled accordingly: "accessing (the PCEF causing a browser redirection at the non-privileged user side)"). The browser may for instance be redirected to the URL of a web server hosted on the network node 100 on which ACM function 100 is hosted. In such a manner, the non-privileged user is directed to ACM function 100, so that the generation of a policy change request can be carried out efficiently and without delay. Optionally, PCEF 300 may transmit, to ACM function 100, information as to why non-privileged user's communication terminal 400 has been redirected (for example using content enrichment in a HTTP request).

Figure 4:
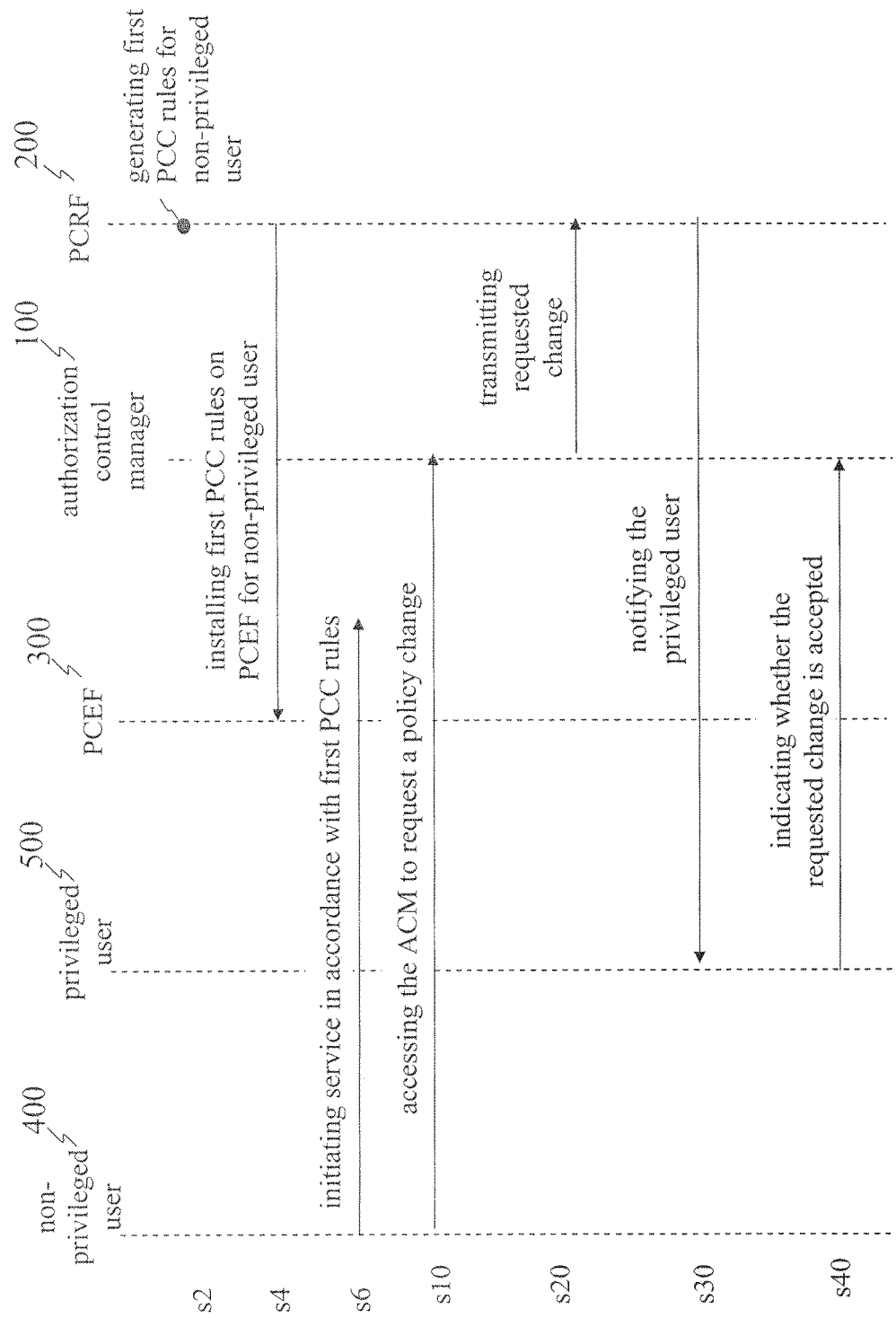
FIG. 4 is a message sequence chart illustrating a method in one embodiment of the invention, including the installation of first PCC rules.

FIG. 4 is a message sequence chart illustrating a method in one embodiment of the invention, which differs from the method illustrated in FIG. 1 as follows. Namely, the following steps are carried out before the step of accessing s10.

First, PCRF 200 generates, in step s2 (as illustrated by the words "generating first PCC rules for non-privileged user"), first PCC rules based on session information negotiated between the non-privileged user's communication terminal 400 and an AF (not illustrated on FIG. 4). The first PCC rules indicate that they apply to a non-privileged user of a multiple-user subscription so that the FCC components handling these rules can adequately treat them. This enables the PCEF to distinguish, on the one hand, the users for whom there is no privileged user to approve an otherwise rejected service, and, on the other hand, the non-privileged users for whom there is a privileged user. In other words, the PCC rules may indicate to the PCEF that, for the non-privileged users, redirection is needed instead of simply refusing the access. Still in other words, the PCEF may be informed regarding (i) whether the user is a normal user of a single subscription (thus lacking a privileged user who could change the authorization), (ii) whether the user is a privileged user of a multiple subscription (and thus also lacking a further privileged user), or (iii) whether the user is a non-privileged user of a multiple-user subscription (who is of particular interest in the context of the present invention), the non-privileged user having a privileged user who may approve a requested change.

Secondly, the first PCC rules are installed on PCEF 300, in step s4 (as illustrated by the arrow labelled "installing first PCC rules on PCEF for non-privileged user"), at establishment or modification of a user plane session associated with the non-privileged user's communication terminal 400.

Thirdly, in step s6 (as illustrated by the arrow labelled "initiating service in accordance with first PCC rules"), a service is initiated in accordance with the first PCC rules for the benefit of the non-privileged user's communication terminal 400. Steps s10, s20, s30, and s40 are then carried out as explained with reference to FIG. 4.

Figure 5:
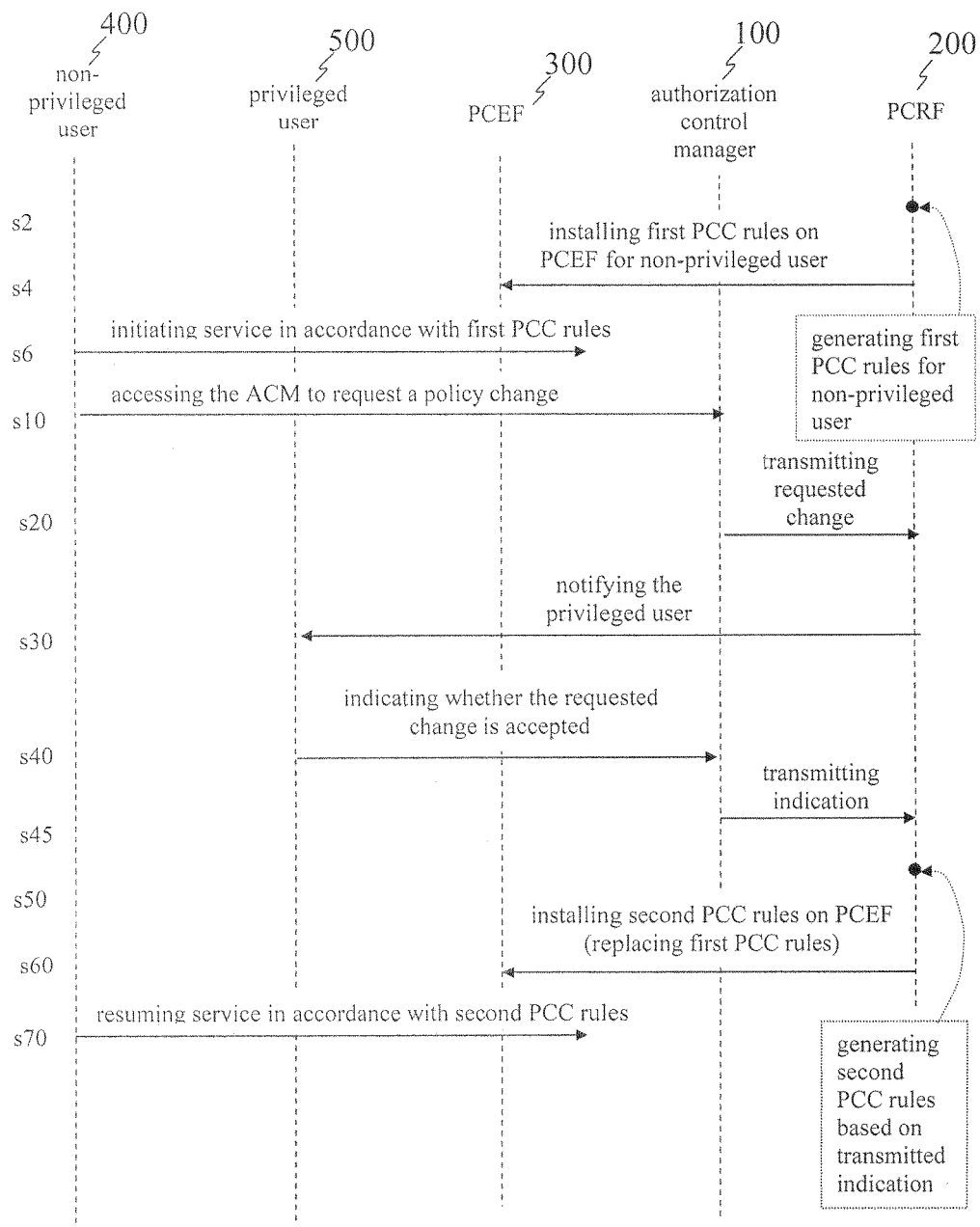
FIG. 5 is a message sequence chart illustrating a method in one embodiment of the invention, including the installation of first FCC rules as well as their later replacement by second PCC rules.

FIG. 5 is a message sequence chart of a method in one embodiment of the invention which differs from the method illustrated in FIG. 4 as follows. After receiving s40 an indication from the privileged user's communication terminal 500 that a requested change has been approved (entirely or partially approved), PCRF 200 is informed about the approval. For example, ACM function 100 may transmit, in step s45 (as illustrated by the arrow labelled "transmitting indication"), a corresponding indication to PCRF 200 in the form of a message. The indication may however be transmitted to PCRF 200 through other network nodes as well. The indication may be transmitted using the same mechanism as the one used by a SPR to communicate with PCRF 200. Then, in step s50 (as illustrated by the words "generating second PCC rules based on transmitted indication"), PCRF 200 generates second PCC rules based on the indication received from the privileged user's communication terminal 500 by ACM function 100 (in step s40). The second PCC rules are then installed (i.e. applied), in step s60 (as illustrated by the arrow labelled "installing second PCC rules on PCEF (replacing first PCC rules)"), at the PCEF 300, by replacing the first PCC rules by the second PCC rules. Finally, in step s70 (as illustrated by the arrow labelled "resuming service in accordance with second FCC rules"), the service offered to the non-privileged user's communication terminal 400 may be continued or resumed in accordance with the second FCC rules.

In one embodiment, steps s10 to s70, as illustrated on FIG. 5, may be carried out during the lifetime of the user plane session (such as an IP-CAN session, see below).

In one embodiment (not illustrated on the drawings), the first time that a non-privileged user accesses ACM function 100, the non-privileged user may indicate to ACM function 100 that, if a further occurrence of the same situation takes place, a privileged user may be contacted without the non-privileged user's permission. It means that a default action will be carried out the next time that the same situation occurs. For these further occurrences, the non-privileged user need not log on every time that the user needs to ask for access or quota to the privileged user. PCEF may notify PCRF directly. Thus, in this embodiment, ACM function 100 may, if the non-privileged user so desires, save the non-privileged user's decision for the next time a further occurrence of the same situation takes place, so as to automatically contact the privileged user without asking confirmation to the non-privileged user. In this context, a further occurrence of the "same situation" may be considered to take place if for example: (i) the non-privileged user sends an HTTP request for a resource at a URL being more specific than a URL of a previously requested resource; and (ii) the non-privileged user requests web content of a more specific type than a previously requested web content (such as for instance, web content of the type "sport game" followed by web content of the type "winter sport game"). The interaction with the privileged user may follow a similar pattern. Namely, in a further embodiment (which may be combined with the one just discussed), the interaction between the ACM function, PCRF, and privileged user may be such that the communication terminal of the privileged user need not necessarily be repeatedly notified by the PCRF for approving some requested changes, if these requested changes relate to occurrences of the same situation. The privileged user's decision in relation to a first requested change (i.e., approval, partial approval or disapproval) may be consider to apply to further requested changes relating to the same situation. For example, a privileged user may indicate, upon deciding on a first requested change relating to a particular content, that the decision also applies to any later requested changes relating to more specific content.

Now, to further understand the advantages of the invention, the context in which some embodiments of the invention have been developed and may be put into practice will be explained in more detail, followed by the description of further embodiments.

Figure 6:
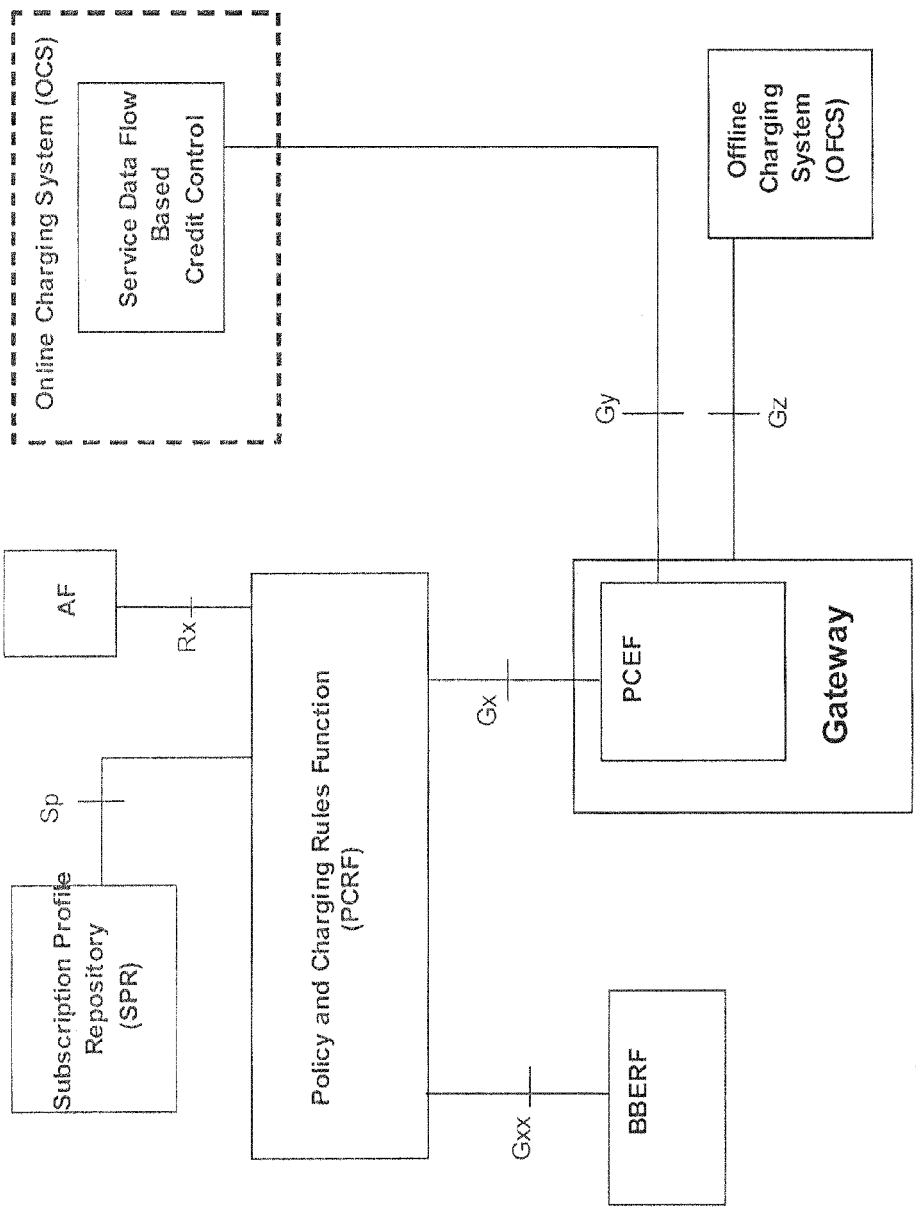
FIG. 6 schematically illustrates components and interfaces of a conventional PCC architecture.
Figure 7:
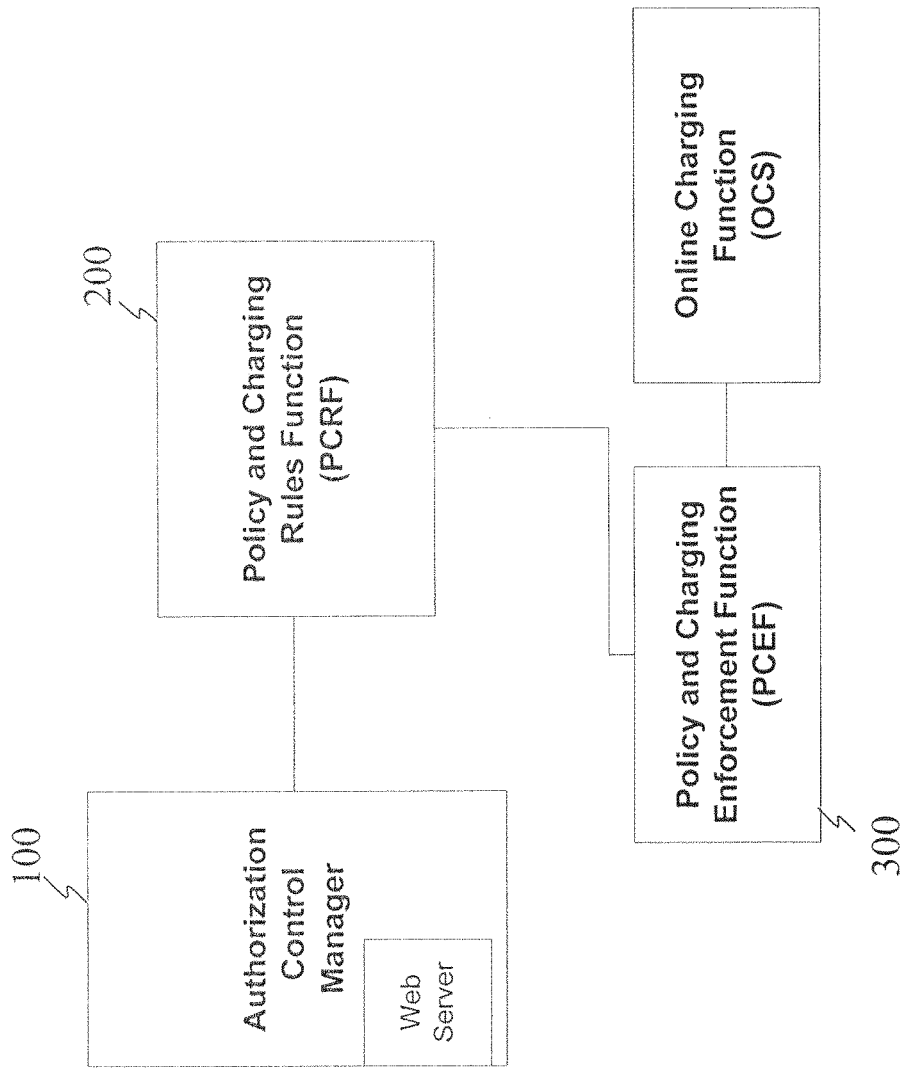
FIG. 7 schematically illustrates some components of a PCC architecture in one embodiment of the invention.

The Internet Protocol (IP) Connectivity Access Network (IP-CAN) is located between the radio access network (RAN) and the core network (CN), connecting access-side signalling to the service controls in the core network. A PCC architecture may take some decisions according to the type of IP-CAN session used. FIG. 6 schematically illustrates a conventional PCC architecture, from "3GPP TS 23.203 V9.11.0 (2012-03)", FIG. 5.1.1 (the document has been already referred to above), in which the scenario involving the IP-CAN may be put into practice. In FIG. 6, the most important reference elements are the following:

- As mentioned above, the PCRF is a functional element that may perform policy control decision and flow based charging control. The PCRF may provide network control regarding the service data flow detection, gating, QoS and flow based charging (except credit management) towards the PCEF.
- As also mentioned above, the PCEF encompasses service data flow detection, policy enforcement and flow based charging functionalities. Deep packet inspection (DPI) technology, embedded in PCEF, supports packet inspection and service classification, which consists on Internet Protocol (IP) packets classified according to a configured tree of rules so that the packets are assigned to a particular service session.
- The Gx reference point is defined for instance in "3GPP TS 29.212 V9.2.0 (2010-03), Technical Specification, 3rd Generation Partnership Project; Technical Specification Group Core Network and Terminals; Policy and Charging Control over Gx reference point (Release 9)" and lies between the PCRF and the PCEF.
- The SPR functional entity comprises subscriber/subscription related information needed for subscription-based policies and IP-CAN bearer level PCC rules by the PCRF.
- The Gy reference point is defined in "3GPP TS 32.299 V9.10.0 (2011-12), Technical Specification, 3rd Generation Partnership Project; Technical Specification Group Services and System Aspects; Telecommunication management; Charging management; Diameter charging applications (Release 9)" and "3GPP TS 32.251 V9.8.0 (2011-12), Technical Specification, 3rd Generation Partnership Project; Technical Specification Group Services and System Aspects; Telecommunication management; Charging management; Packet Switched (PS) domain charging (Release 9)" located between the PCEF and the online charging system (OCS).

Let us now discuss some of the problems addressed by embodiments of the invention, for further understanding the context in which some embodiments of the invention have been developed.

Telecommunication operators often have a significant amount of subscribers who belongs to a multiple-user subscription (also called "global subscription") that is shared by all of its members but only one of them—or some of them—has the privilege over this account. Most families have a multiple-user subscription wherein all members of the families are associated to the multiple-user subscription. In an analogue way, there are many employees who have their associated contracts with their company. These employees have a restricted access for some specific services. In both examples (family and company), only the privileged user(s) (also called "owner(s)") of the multiple-user subscription may authorize services. It has been recognized however that it is a burden on both the non-privileged user(s) and the privileged user(s) to authorize a service whenever a non-privileged user wants to use or access one of the non-authorized services. In the prior art, non-privileged users have to ask for permission to a privileged user of their multiple-user subscription. Then, the privileged user has to contact the telecommunication network operator for allowing these services to be authorized for these non-privileged users. In that respect, different scenarios may be described as follows:

In a parental control scenario, parents may be the privileged users of the subscription, and may therefore, to a large extent, control the subscription of their children (the non-privileged users) in the sense that the parents have the authority to authorize which services the non-privileged users may access or the conditions under which the non-privileged users may access such services. In these scenarios, the parents may set limits on and control their children's usage across all services, such as all wireless services. Prior art parental control mechanisms may allow end users acting as privileged users to select a predefined content-category list that defines the contents to be monitored. These categories are usually defined by external sources (telecommunication network operator, third parties) rather than by the end users acting as privileged users.

In many cases, these content-category lists do not satisfy the end user content-filtering requirements. These content-category lists may be quite often too limited and conservative. End users acting as non-privileged users (such as for instance children) are not allowed to navigate to some pages whose contents should not be forbidden according to their parents' opinion.

For example, children for whom the parental control is activated may want to access to content that is categorized as blocked content according to parental control mechanism but not according to their actual parents' criterion. There may therefore be a discrepancy between parent's criterion and content filtering criteria. In prior art solutions, there is no chance for end users acting as non-privileged users to be allowed immediately to access these contents that they think they cannot be restricted.

Another type of scenario relates to credit control mechanisms and services authorization. In such a scenario, a non-privileged user who belongs to a multiple-user subscription may at one point have consumed all credit granted to him/her individually for his/her subscription. If, at that point, the non-privileged user is running out of credit but wants, or needs, to urgently access a service, the non-privileged user cannot do so since the non-privileged user has insufficient credit. As in the previous exemplary scenario (parental control mechanism), the non-privileged user cannot easily ask, in the prior art, for more credit to a privileged user of their multiple-user subscription.

The two above-discussed scenarios (parental control, credit control) may also be influenced by user session characteristic, for example if the user is roaming. It is common that subscribers have to activate roaming before going abroad. There may also be some company restrictions that prevent users from accessing services when they are abroad.

Therefore, prior art mechanisms do not enable end users acting as non-privileged users to quickly and efficiently ask, without requiring a possibly burdensome contact with a human operator, for permission when a service is denied according to the policy installed in a charging control server or in a policy control server.

In view of these problems, embodiments of the invention notably encompass a solution to allow privileged users of a multiple-user subscription to efficiently and quickly authorize services for non-privileged users of their multiple-user subscription when the privileged users are asked for permission. Some embodiments of the invention may be used for parental control (e.g., authorization via Gx interface) or credit control (e.g., authorization via Gy interface or Gx interface). The invention is, however, not limited to these applications.

In the context of parental control mechanisms, embodiments of the invention provide new methods for quickly and efficiently authorizing services that were previously denied to the non-privileged users (e.g., children). In the context of credit control mechanisms, embodiments of the invention may also provide new methods for efficiently and quickly granting credit to the non-privileged users (e.g., employees) who are running out of credit.

In embodiments of the invention, a new functional element, the ACM function, as described above, is provided. In one embodiment, the ACM function is hosted on a SPR. The ACM function may be characterized as follows, according to some embodiments, which may be combined with one another:

In one embodiment, the ACM function provides an intermediary system thanks to which non-privileged users can ask for permission to access content, such as web content. The non-privileged users may have previously attempted to access the content. The privileged users are then responsible for granting or denying access to non-privileged users. The system provided by the ACM function is intermediary in the sense that the system is configured to functionally operate between the non-privileged user(s) and the privileged user(s). Besides, the system provided by the ACM function may also be interactive in the sense that it may contain a computer program (or the like) for responding to user activity.

In one embodiment, the ACM function provides an intermediary system for providing additional credit when non-privileged users are running out of credit.

In one embodiment, the ACM function comprises a database indicating which actions the privileged users are able to authorize to non-privileged users. The relationship between privileged users and non-privileged users should be stored in the database, to define the multiple-user subscription(s) associated with these users. This type of relationship is established when the users contract the subscription with the telecommunication network operator. For example, parents with their children may have a family multiple-user subscription in the context of which the parents are the privileged users and the children are the non-privileged users.

In one embodiment, the ACM function sends this user information (regarding the definition of the multiple-user subscriptions) to the PCRF via an LDAP interface or via other interfaces.

In one embodiment, a method is provided for implementing a parental control mechanism, wherein the method comprises the following steps:

Identifying a service access of a specific non-privileged user thanks to the DPI technology embedded in PCEF (this step corresponds to step s8 in FIGS. 2 and 3), When the PCEF detects that the non-privileged user tries to access a forbidden service, redirecting the non-privileged user to the ACM function providing an intermediary system (web-server, text messaging, multimedia messaging, or the like) where the non-privileged user can generate a request to be handled by a privileged user (this step corresponds to step s10 in FIG. 3).

In this intermediary system provided by the ACM function, the non-privileged user needs to log on to the system with specific user name and password. Once the non-privileged user has been authenticated and authorized, an interface is offered to the non-privileged user (i) to select the privileged user who should be in charge of handling the request and (ii) to generate the request, such as asking for permission to accessing a service (or type of service), increase the available credit, etc. (this step also corresponds to step s10 in FIG. 3).

According to the selection carried out by the non-privileged user, the requested change is transmitted to the PCRF (and optionally also to the PCEF) (this step corresponds to step s20 in FIG. 3). For example:

The ACM function sends the requested change towards the PCRF.

The following three attributes (a triplet) may be sent:
Multimedia content reference (URL or similar);
Privileged user to whom permission should be asked; and
Content-type (file, streaming, web access, voice over IP (VoIP) call, instant messaging).

The PCRF notifies the privileged user about which non-privileged user has requested a change of policy and which content-type the non-privileged user is attempting to access (this step corresponds to step s30 in FIG. 3). The information provided by the PCRF to the communication terminal of the privileged user may also include information as to whether the non-privileged user is roaming.

The privileged user selects through the ACM function which actions can be performed for this non-privileged user and service (this step corresponds to step s40 in FIG. 4).

Following these actions, the non-privileged user is either allowed or denied the use of the service.

In one embodiment, a method is provided for implementing a credit control mechanism, wherein the method comprises the following steps:

Identifying the service access of a specific non-privileged user thanks to the DPI technology embedded in PCEF (this step corresponds to step s8 in FIGS. 2 and 3).

If the identified service access cannot be provided, redirecting the request of a non-privileged user to the ACM function providing an intermediary system (web-server, text messaging, multimedia messaging, or the like) where the non-privileged user can generate a request to be handled by a privileged user in order to obtain more credit (this step corresponds to step s10 in FIG. 3).

In this intermediary system provided by the ACM function, the non-privileged user needs to log on to the system with specific user name and password. Once the non-privileged user has been authenticated and authorized, an interface is offered to the non-privileged user to enable him/her to select the privileged user from whom to obtain more credit (this step also corresponds to step s10 in FIG. 3).

The following information may be transmitted by the ACM function to the PCRF (and optionally also to the PCEF) (this step corresponds to step s20 in FIG. 3):
The ACM function may for example send the following attributes towards the PCRF:
Multimedia content reference (URL or similar) (optional for the credit mechanism);
Privileged user to ask for more credit;
Content-type (file, streaming, web access, VoIP call, instant messaging); and
Information regarding the requested credit.

The PCRF notifies the privileged user that a specific non-privileged user has insufficient credit and/or that the non-privileged user is attempting to access a specific content-type (this step corresponds to step s30 in FIG. 3). The notified information may also comprise information as to whether the non-privileged user is roaming. The privileged user selects which actions can be performed for this specific non-privileged user in relation to the specific service at stake. The privileged user logs on to the ACM function and selects which credit is granted for non-privileged users (this step corresponds to step s40 in FIG. 3).

Following these actions, the non-privileged user is allowed or denied the use of the service.

In one embodiment, at least the following network nodes are involved in a method for enabling a privileged user to efficiently and quickly change the policy and/or charging parameters applicable to a non-privileged user of the same multiple-user subscription, namely:
The communication terminals of the two users:
The communication terminal of the non-privileged user who is attempting to access a service or content. This may for instance be a child in a parental control scenario.
The communication terminal of the privileged user who can grant the non-privileged user access to some services or content. This may for instance be a parent in a parental control scenario.
The PCEF is responsible for enforcing policies with respect to authentication of subscribers, authorization to access and services, and accounting and mobility. The PCEF may embed DPI technology notably to analyze the communication and determine user bandwidth.
The PCRF hosts the individual policies defining network, application, and subscriber conditions that must be met in order to successfully deliver a service or maintain the QoS of a given service. For both the exemplary parental control mechanism and the exemplary credit control mechanism, the PCRF may communicate the requested change using SMS or HTTP to the privileged user. This is advantageous because the network node hosting the PCRF can generally communicate towards a short message service centre (SMSC).
The SPR is a functional entity that may be a standalone database or, alternatively, a functional entity integrated into an existing subscriber database such as a home subscriber server (HSS). The SPR stores information such as entitlements, rate plans, etc. The ACM function may be integrated within the SPR. The ACM function provides an intermediary system through which the non-privileged users may select the services or multimedia content for which a policy change can be requested. The ACM function also notifies the PCRF once a requested change is received. The ACM function also provides an intermediary system through which the privileged user may approve or disapprove the requested change. In one embodiment, the SPR stores, for each non-privileged user, information as to which privileged user can block or allow their services. By default (according to one policy on the SPR), in one embodiment, everybody is allowed to use all the services.
The Online Charging System (OCS) of a PCC architecture as defined for example in "3GPP TS 32.296 V9.2.0 (2010-12), Technical Specification, 3rd Generation Partnership Project; Technical Specification Group Services and System Aspects; Telecommunication management; Charging management; Online Charging System (OCS): Applications and interfaces (Release 9)".

Beside these network nodes, the customer contact centre is the interface between end users and telecommunication network operator which provides and provisions all the subscription information to the end users.

Three further embodiments of the invention will now be described with reference to FIGS. 8a-8b, FIGS. 9a-9b, and FIGS. 10a-10b respectively.

Figure 8A:
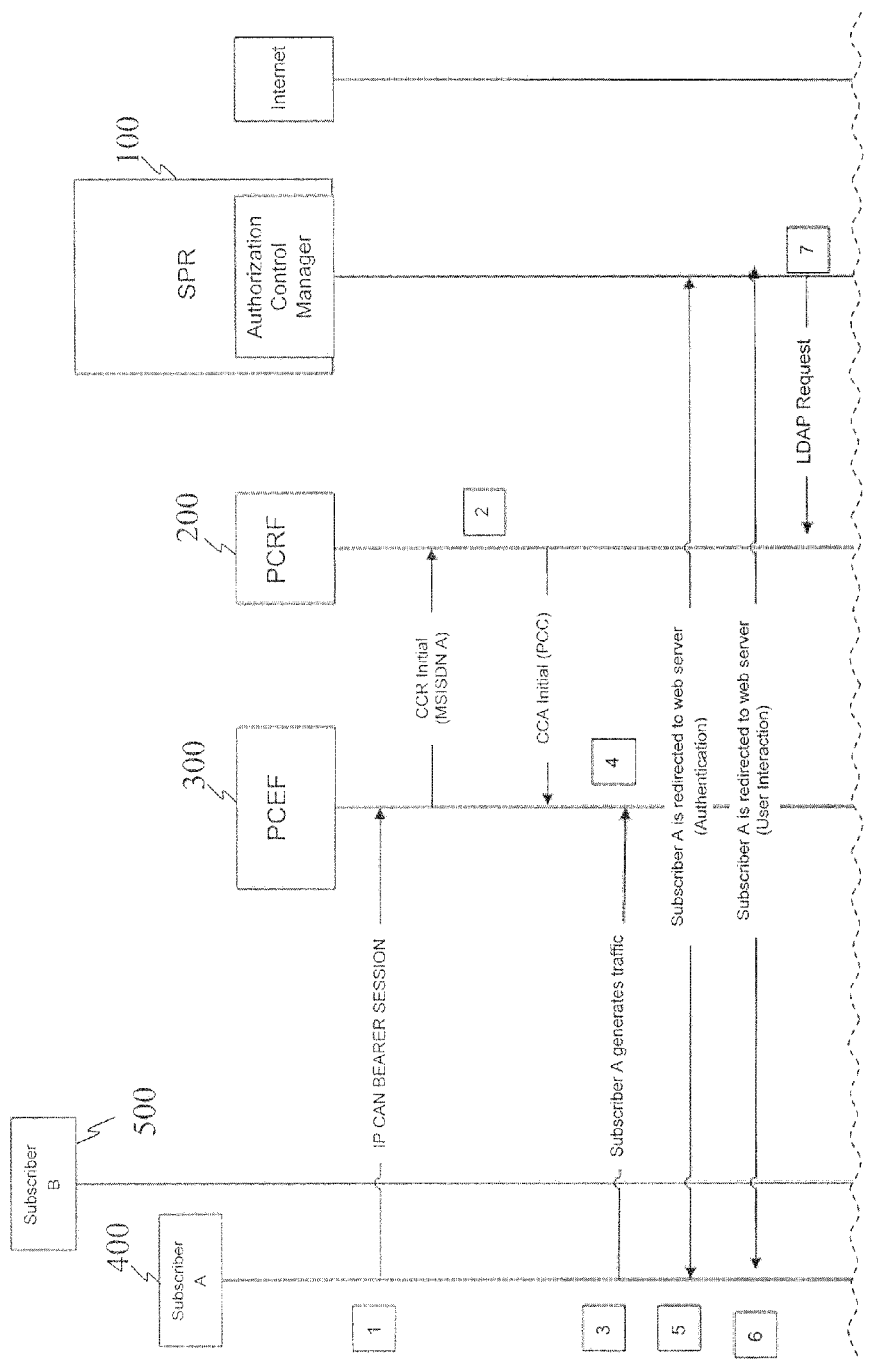
FIGS. 8a and 8b together constitute a message sequence chart illustrating a method in one embodiment of the invention, for implementing a parental control mechanism.
Figure 8B:
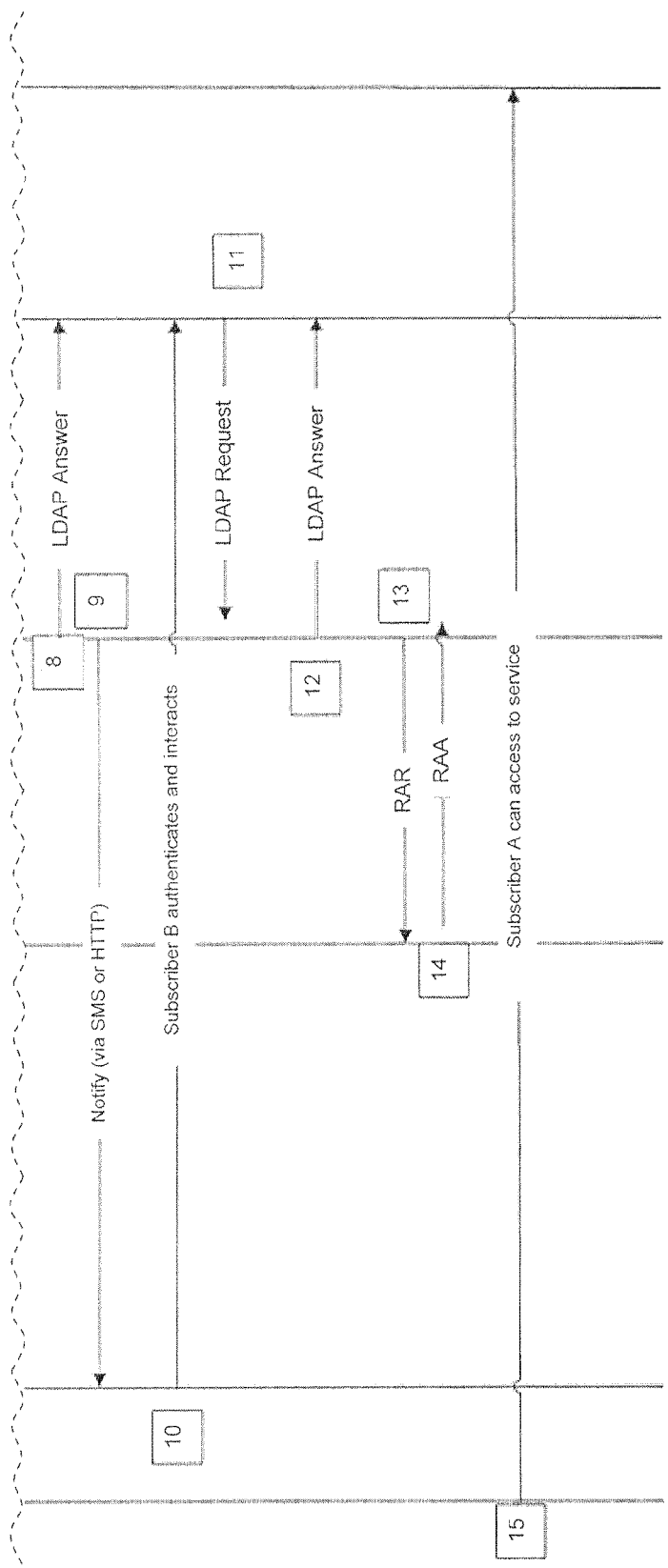

First, referring to FIGS. 8a-8b (constituting together a single message sequence chart), in the context of a parental control mechanism, a method in accordance with one embodiment of the invention is schematically illustrated in which:

(step 1) A non-privileged user 400 ("Subscriber A") logs on to the core packet network. When non-privileged user 400 connects to the network, a first IP-CAN session is established at a PCEF 300 with DPI capabilities (as illustrated by the arrow labelled "IP CAN BEARER SESSION" on FIG. 8a) or, alternatively, an existing IP-CAN session is modified. Depending on the solution chosen for implementing step 3, non-privileged user 400 may need to browse an operator internal web page to confirm the network access. PCEF 300 requests the PCC rules from PCRF 200. PCRF 200 returns the PCC rules to be applied to the IP CAN bearer traffic.

(step 2) PCEF 300 establishes with the PORE 200 an initial control session with the default rules loaded. This is illustrated by the arrows labelled "CCR Initial (MSISDN A)" and "CCA Initial (FCC)" on FIG. 8a, wherein "CCR" stands for Credit-Control-Request and "CCA" stands for Credit-Control-Answer, both messages being defined in "H. Hakala et al, "Diameter Credit-Control Application", RFC 4006, The Internet Society, Network Working Group, August 2005".

(step 3) Non-privileged user 400 ("Subscriber A") requests a web page from an Internet web server. This step is illustrated by the arrow labelled "Subscriber A generates traffic" on FIG. 8a. This step corresponds to step s8 in FIG. 3.

(step 4) PCEF 300 with DPI capabilities detects which service the non-privileged user 400 ("Subscriber A") is attempting to access. According to its policy rules, PCEF 300 detects that this traffic is forbidden for this non-privileged user 400. PCEF 300 is configured to notify the traffic usage to the ACM function 100 ("Authorization Control Manager" on FIG. 8a). This notification may be implemented in several ways. One possibility is to redirect non-privileged user 400 request to a web server (a redirection based on HTTP protocol). However, this option may only be possible for HTTP services. If user 400 is running an application which is not based on HTTP (such as for instance video streaming, VoIP applications, Instant messaging), then another approach may be that previously the non-privileged user 400 has opened a HTTP connection towards the ACM function 100 (which may be implemented in the form of a web server).

(step 5) The non-privileged user 400 ("Subscriber A") logs on to the ACM function 100. Initially, non-privileged user 400 needs to be authenticated to avoid misusing. For example, non-privileged user 400 introduces a username/password that has already been sent by email or telephone from the customer contact centre. This username/password is different for the privileged user and for the other users, i.e. for the non-privileged users, of the same subscription. This step is illustrated by the arrow labelled "Subscriber A is redirected to web server (Authentication)" on FIG. 8*a*.

(step 6) Once non-privileged user 400 is authenticated, a web page (as part of ACM function 100) offers a HTTP form with different options.
  a. Non-privileged user 400 has the possibility to ask for permission to access the service that has been denied.
  b. If non-privileged user 400 was browsing in step 4, ACM function 100 may offer to select the original web page to be approved by his/her privileged users or accessed after a confirmation for his/her privileged users.

This step is illustrated by the arrow labelled "Subscriber A is redirected to web server (User Interaction)" on FIG. 8*a*. This step corresponds to step s10 in FIG. 3.

(step 7) ACM function 100 notifies this selection to PCRF 300 via, for instance, LDAP interface by a Modify Request (LDAP). The LDAP message contains the data of the user, the selected services/URLs, and actions to be applied. This step is illustrated by the arrow labelled "LDAP Request" on FIG. 8*a*. This step corresponds to step s20 in FIG. 3.

(step 8) PCRF 200 answers this request via LDAP confirming this change (Modify Response in LDAP). This step is illustrated by the first arrow labelled "LDAP Answer" on FIG. 8*b*.

(step 9) PCRF 200 sends to the privileged user a notification (in the form, for instance, of a SMS or HTTP message, depending on the privileged user connectivity status) indicating that a particular non-privileged user asked him to be granted access to some specific services. The PCRF may also indicate to the privileged user whether the non-privileged user is roaming. One example of this notification may be: "Do you want to allow service <Original_URL> for user <SUBSCRIBER A> who is roaming?" This step is illustrated by the arrow labelled "Notify (via SMS or HTTP)" on FIG. 8*b*. This step corresponds to step s30 in FIG. 3.

As already mentioned similarly in relation to step 4 (in relation to non-privileged user 400), if privileged user 500 is running an application which is not based on HTTP (such as for instance video streaming, VoIP application, instant messaging), then the privileged user 500 may receive notifications from ACM function 100 through an HTTP connection previously opened by privileged user 500.

More generally, the notifications from ACM function 100 may be received by privileged user 500 directly or through other network nodes such as PCRF 300. Since PCRF 300 has the capability to locate a user and send a notification, it is advantageous that PCRF 300 be in charge of notifying the requested change. However, in a case where ACM function 100 is configured with the capability to directly communicate the requested change to privileged user 500, i.e. provided that ACM function 100 is aware of connection status information and subscription profile, ACM function 100 may notify the privileged user's communication terminal directly. These notifications will ask privileged user 500 if this application should be restricted and, if so, what actions are to be done (same actions as step 6.b describes).

(step 10) Privileged user 500 ("Subscriber B") depending on his/her connectivity status answers via SMS or logs on to ACM function 100. Privileged user 500 authenticates towards web server. Once this is selected, privileged user 500 may also have the chance to define the action that should apply for this particular non-privileged user and service, such as:
  i. Grant access;
  ii. In addition to the granted access, notification to privileged user (by mail or SMS) when contents from these URLs are being accessed or downloaded—this is optional;
  iii. In addition to previous conditions, limitation about the service usage (time/quota)—this therefore defines the extent to which the request is granted in a detailed manner;
  iv. Denied access.

This step is illustrated by the arrow labelled "Subscriber B authenticates and interacts" on FIG. 8*b*. This step corresponds to step s40 in FIG. 3.

(step 11) ACM function 100 sends this decision towards PCRF 200. This step is illustrated by the arrow labelled "LDAP Request" on FIG. 8*b*.

(step 12) PCRF 200 acknowledges this request. This step is illustrated by the second arrow labelled "LDAP Answer" on FIG. 8*b*.

(step 13) PCRF 200 updates the non-privileged user subscription with the new information. PCRF 200 sends the new PCC rules to be applied according to the updated subscription of the non-privileged user for IP CAN Bearer traffic via Gx interface using RAR message in Diameter protocol to PCEF 300 (wherein "RAR" stands for Re-Auth-Request, and is defined in "P. Calhoun et al, "Diameter Base Protocol", RFC 3588, The Internet Society, Network Working Group, September 2003"). These new PCC rules may contain the selected URLs, services and actions to be done by this new FCC rules. Optionally, the PCRF could also notify the time to apply the new rules. This step is illustrated by the arrow labelled "RAR" on FIG. 8*b*.

(step 14) PCEF 300 acknowledges the message sent by PCRF 200 and installs the new PCC rules. This step is illustrated by the arrow labelled "RAA" on FIG. 8*b*. "RAA" stands for Re-Auth-Answer, and is defined in "RFC 3588" as mentioned above.

(step 15) Non-privileged user 400 ("Subscriber A") is then able to access this service if privileged user 500 has approved it. This step is illustrated by the arrow labelled "Subscriber A can access to service" on FIG. 8*b*.

The Diameter protocol has been employed in the method illustrated by FIGS. 8*a*-8*b*. However, other protocols, such for instance LDAP, can also be employed.

Figure 9A:
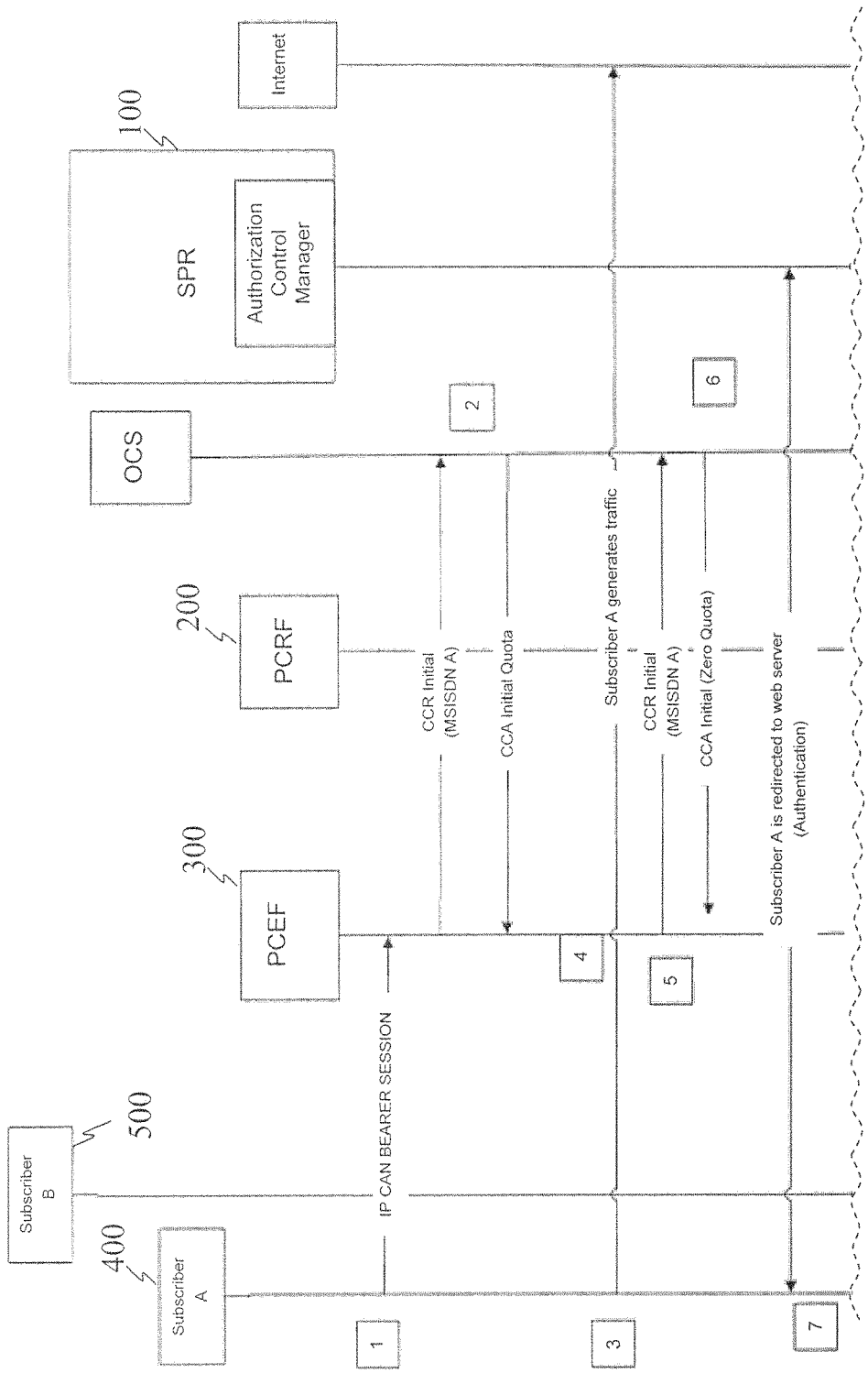
FIGS. 9a and 9b together constitute a message sequence chart illustrating a method in one embodiment of the invention, for implementing a credit control mechanism, wherein the PCEF cannot change charging profiles dynamically.
Figure 9B:
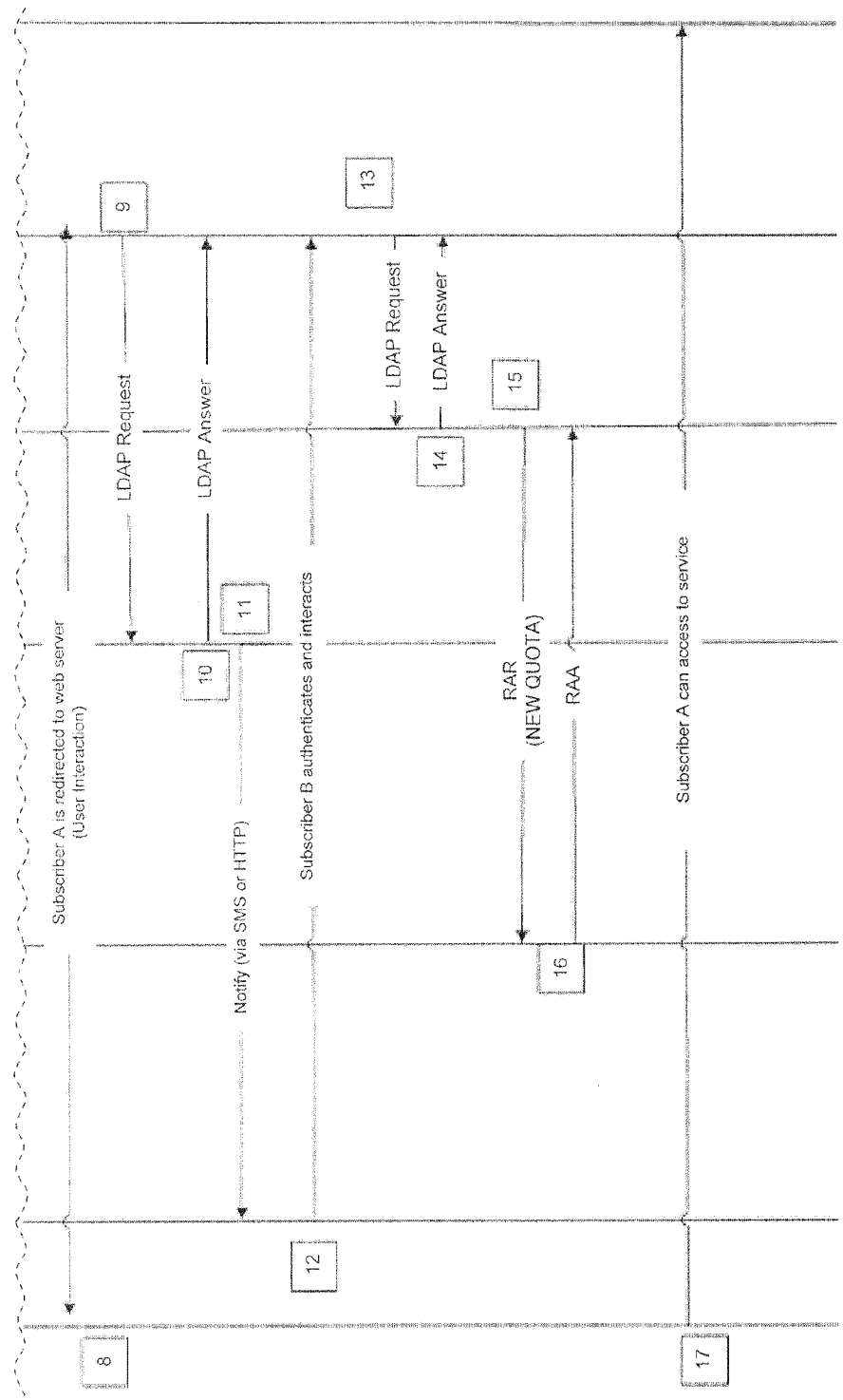
Figure 10A:
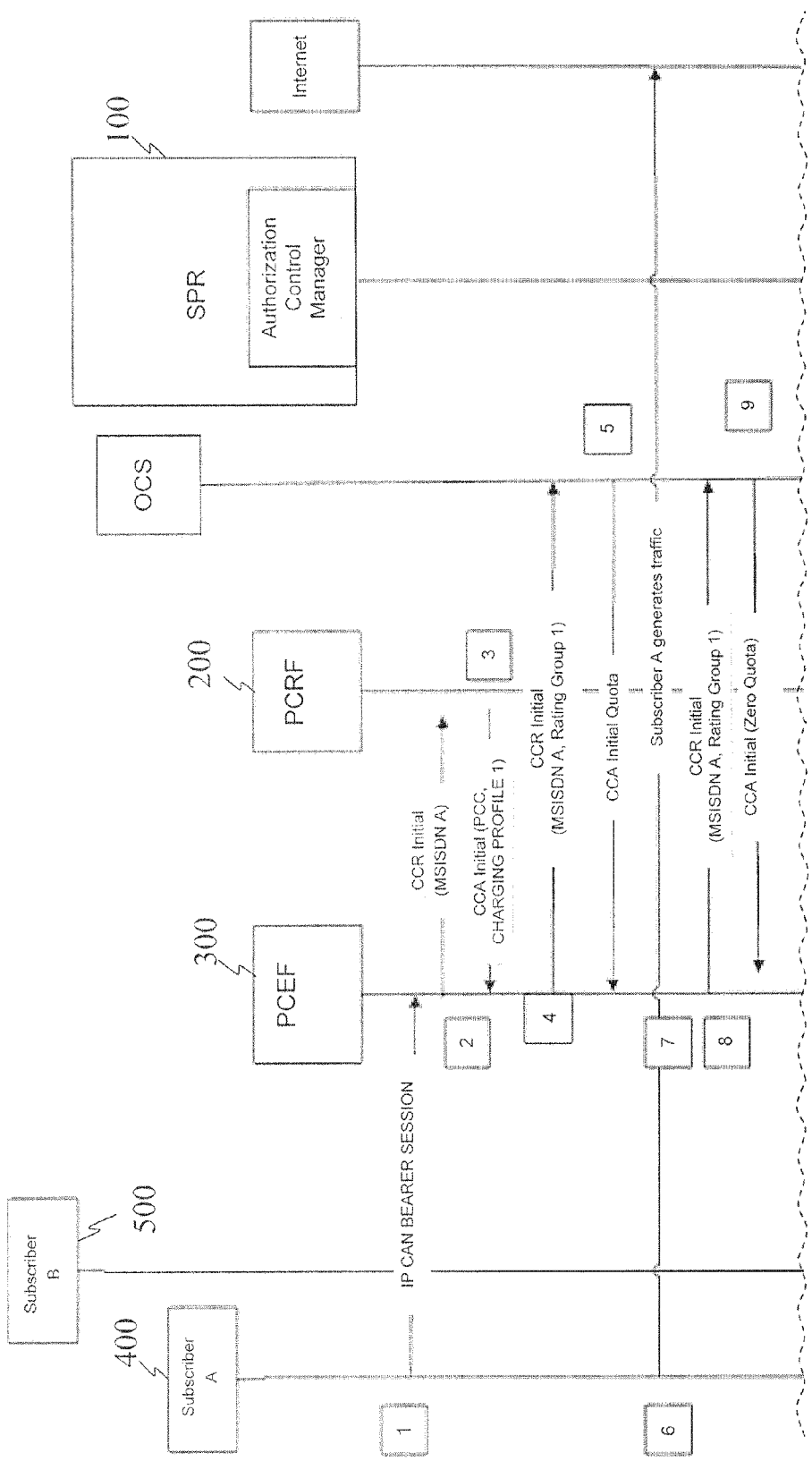
FIGS. 10a and 10b together constitute a message sequence chart illustrating a method in one embodiment of the invention, for implementing a credit control mechanism, wherein the PCEF can change charging profiles dynamically.
Figure 10B:
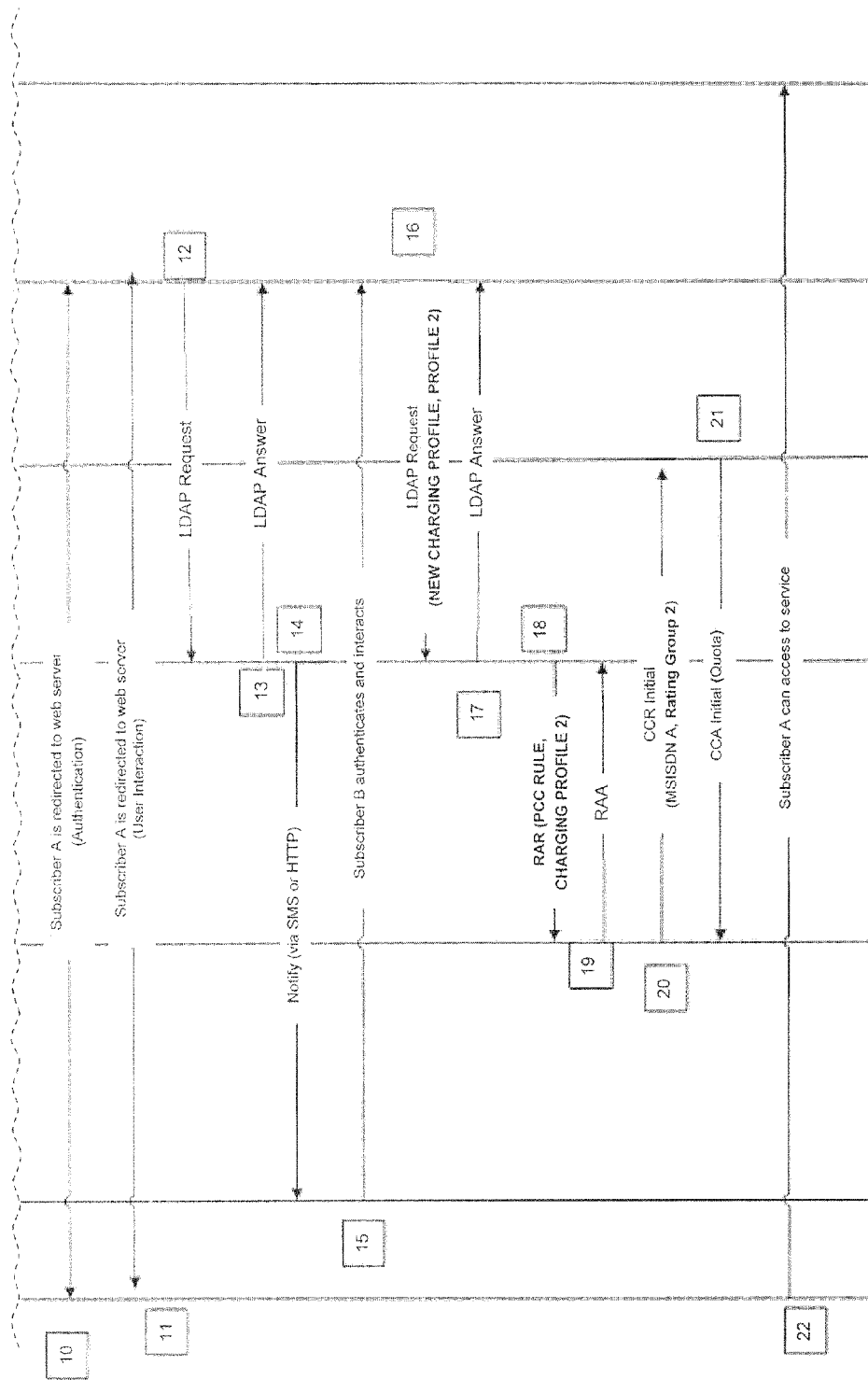

The two embodiments illustrated with reference to FIGS. 9*a*-9*b* and FIGS. 10*a*-10*b* are methods carried out in the context of credit control mechanisms, where either the PCEF cannot change charging profiles dynamically (FIGS. 9*a*-9*b*) or the PCEF can change charging profiles dynamically (FIGS. 10*a*-10*b*). In the embodiment where the PCEF cannot change charging profile dynamically, ACM function 100 communicates directly with OCS. Then, the OCS changes its rating group towards the PCEF. In the embodiment where the PCEF can change charging profile dynamically, the subscriber charging profile can be set and updated through the Gx interface, allowing the dynamic configuration of service charging properties during the lifetime of the Packet Data Protocol (PDP) context. In that embodiment, ACM function 100 may be installed in the SPR, which is generally connected to the PCRF through a network. In this embodiment therefore, there need not be any relation between ACM function 100 and the OCS. ACM function 100 sends the information towards PCRF 200. PCRF 200 then sends a new charging profile towards PCEF 300, which then knows the new rating group for this charging profile and changes its rating group towards OCS.

Now, referring to FIGS. 9a-9b (constituting together a single message sequence chart), in the context of a credit control mechanism in which the PCEF 300 cannot change charging profiles dynamically, a method in accordance with one embodiment of the invention is schematically illustrated in which:

(step 1) A non-privileged user 400 ("Subscriber A") logs on to the core packet network. When non-privileged user 400 connects to the network, a first IP-CAN session is established at a PCEF 300 with DPI capabilities (this is illustrated by the arrow labelled IF CAN BEARER SESSION" on FIG. 9a) or, alternatively, an existing IP-CAN session is modified. Optionally, non-privileged user 400 may need to access an operator internal web page to confirm the network access. PCEF 300 requests the PCC rules from PCRF 200. PCRF 200 returns the PCC rules to be applied to the IP CAN bearer traffic.

(step 2) PCEF 300 establishes with OCS an initial control session with the credit quota. This is illustrated by the arrow labelled "CCR Initial (MSISDN A)" and "CCA Initial Quota" on FIG. 9a.

(step 3) Non-privileged user 400 requests a web page from an Internet web server. This step is illustrated by the arrow labelled "Subscriber A generates traffic" on FIG. 9a. This step corresponds to step s8 in FIG. 3.

(step 4) PCEF 300 with DPI capabilities detects which service the non-privileged user 400 is accessing or attempting to access.

(step 5) PCEF 300 asks for quota to OCS. This is illustrated by the arrow labelled "CCR Initial (MSISDN A)" on FIG. 9a.

(step 6) OCS answers that this user has zero quota (i.e., no credit on its sub-account within the multiple-user subscription). This is illustrated by the arrow labelled "CCA Initial (Zero Quota)" on FIG. 9a.

(step 7) PCEF 300 detects, in the context of its charging control session, that non-privileged user 400 has insufficient credit, PCEF 300 is configured to notify the traffic usage to ACM function 100. This notification can be implemented in several ways, One possibility is to redirect non-privileged user 400 request to a web server (a redirection based on HTTP protocol). This is illustrated by the arrow labelled "Subscriber A is redirected to web server (Authentication)" on FIG. 9a. However, this option may work only for HTTP services. If non-privileged user 400 is running an application which is not based on HTTP (such as for instance video streaming, VoIP applications, instant messaging), another option may be that, previously, non-privileged user 400 opened a HTTP connection towards ACM function 100 (which may be implemented in the form of a web server). This connection would be updated based on notifications from ACM function 100. Non-privileged user 400 logs on to the ACM function 100. Initially, non-privileged user 400 may need to be authenticated to avoid misusing. For example, non-privileged user 400 introduces a username/ password that was sent to him/her beforehand by email or telephone from the customer contact centre.

(step 8) Once non-privileged user 400 is authenticated, a web page may offer a HTTP form (such as a HTML form via HTTP protocol) with different options, such as:
   a. Non-privileged user 400 may request a quota extension (i.e., increase of credit).
   b. Non-privileged user 400 may ask for access to a new service.

This step is illustrated by the arrow labelled "Subscriber A is redirected to web server (User Interaction)" on FIG. 9b. This step corresponds to step s10 in FIG. 3.

(step 9) ACM function 100 notifies this selection to PCRF 200 via LDAP interface by a Modify Request message (LDAP)). The LDAP message contains the data of the user, the services/URLs and quota/access that non-privileged user 400 ("Subscriber A") is requesting to privileged user 500 ("Subscriber B"). This is illustrated by the first arrow labelled "LDAP Request" on FIG. 9b.

(step 10) PCRF 200 answers this request via LDAP confirming this change (Modify Response message in LDAP). This is illustrated by the first arrow labelled "LDAP Answer" on FIG. 9b. This step corresponds to step s20 in FIG. 3.

(step 11) PCRF 200 sends, to privileged user 500, a notification indicating that non-privileged user 400 requested additional credit. The notification may be in the form of a SMS or HTTP message depending on the connection status of privileged user 500. Additional information may be provided as to whether non-privileged user 400 is roaming. This is illustrated by the arrow labelled "Notify (via SMS or HTTP)" on FIG. 9b. This step corresponds to step s30 in FIG. 3.

(step 12) Privileged user 500 answers via SMS or logs on to ACM function 100, depending on the connectivity status of privileged user 500. Privileged user 500 authenticates towards web server. Once logged on, privileged user 500 may attend incoming requests and make a decision to:
   i. grant a specific quota;
   ii. grant a specific duration;
   iii. always grant during a time range or time schedule (weekends, 9 pm-8 am Monday-Tuesday, etc.);
   iv. grant always for specific services.

This step is illustrated by the arrow labelled "Subscriber B authenticates and interacts" on FIG. 9b. This step corresponds to step s40 in FIG. 3.

(step 13) ACM function 100 sends this decision towards OCS. This is illustrated by the second arrow labelled "LDAP Request" on FIG. 9b.

(step 14) OCS acknowledges this request. This is illustrated by the second arrow labelled "LDAP Answer" on FIG. 9b.

(step 15) OCS changes the quota conditions for non-privileged user 400 according to the information provided in step 13. Then, OCS sends, to PCEF 300, new extended quota to be applied for IP CAN Bearer traffic via Gy interface using RAR message in Diameter protocol. This is illustrated by the arrow labelled "RAR (NEW QUOTA)" on FIG. 9b.

(step 16) PCEF 300 acknowledges the message sent by OCS (this is illustrated by the arrow labelled "RAA" on FIG. 9b) and installs the new rules.

(step 17) Non-privileged user 400 ("subscriber A") is then able to access the service provided that privileged user 500 has accepted the request. This step is illustrated by the arrow labelled "Subscriber A can access to service" on FIG. 9b.

Now, referring to FIGS. 10a-10b (constituting together a single message sequence chart), in the context of a credit control mechanism in which the PCEF 300 can change charging profiles dynamically, a method in accordance with one embodiment of the invention is schematically illustrated in which:

(step 1) A non-privileged user 400 ("Subscriber A") logs on to the core packet network. When non-privileged user 400 connects to the network, a first IP-CAN session is established at a PCEF 300 with DPI capabilities (this is illustrated by the arrow labelled "IP CAN BEARER SESSION" on FIG. 10*a*) or, alternatively, an existing IP-CAN session is modified. Optionally, non-privileged user 400 may need to access an operator internal web page to confirm the network access. PCEF 300 requests the PCC rules from PCRF 200. PCRF 200 returns the PCC rules to be applied to the IP CAN bearer traffic.

(step 2) PCEF 300 establishes with PCRF 200 an initial control session. This is illustrated by the arrow labelled "CCR Initial (MSISDN A)" on FIG. 10*a*.

(step 3) PCRF 200 answers with the initial charging profile for non-privileged user 400. The charging profile is an identifier that indicates which tariff has to be applied. This is illustrated by the arrow labelled "CCA Initial (FCC, CHARGING PROFILE 1)" on FIG. 10*a*.

(step 4) PCEF 300 establishes with OCS an initial control session. It indicates the rating group (information used by the online and offline charging system for rating purposes) associated to the charging profile downloaded in the previous step. This is illustrated by the first arrow labelled "CCR Initial (MSISDN A, Rating Group 1)" on FIG. 10*a*.

(step 5) OCS answers with the initial quota for non-privileged user 400. This is illustrated by the arrow labelled "CCA Initial Quota" on FIG. 10*a*.

(step 6) Non-privileged user 400 requests a web page from an Internet web server. This is illustrated by the arrow labelled "Subscriber A generates traffic" on FIG. 10*a*, This step corresponds to step s8 in FIG. 3.

(step 7) PCEF 300 with DPI capabilities detects which service the non-privileged user 400 is accessing.

(step 8) PCEF 300 asks for quota to OCS. This is illustrated by the second arrow labelled "CCR Initial (MSISDN A, Rating Group 1)" on FIG. 10*a*.

(step 9) OCS answers that non-privileged user 400 has zero quota (i.e., no more credit). This is illustrated by the arrow labelled "CCA Initial (Zero Quota)" on FIG. 10*a*.

(step 10) PCEF 300 detects, in the context of its charging control session, that non-privileged user 400 has insufficient credit. PCEF 300 is configured to notify the traffic usage to ACM function 100. This notification can be implemented in several ways. One possibility is to redirect non-privileged user 400 request to a web server (a redirection based on HTTP protocol). This is illustrated by the arrow labelled "Subscriber A is redirected to web server (Authentication)" on FIG. 10*b*. However, this option may work only for HTTP services. If non-privileged user 400 is running an application which is not based on HTTP (such as for instance video streaming, VoIP applications, instant messaging), another approach may be that non-privileged user 400 beforehand opened a HTTP connection to ACM function 100 (web server). This connection would be updated based on notification from ACM function 100. Non-privileged user 400 logs on to ACM function 100. Initially, non-privileged user 400 may need to be authenticated to avoid misusing. For example, non-privileged user 400 introduces a username/password that was previous received by email or telephone from a customer contact centre.

(step 11) Once non-privileged user 400 is authenticated, a web page offers a HTML form via HTTP protocol with different options, such as for instance:
  a. non-privileged user 400 may request a quota extension (i.e., an increase of credit).
  b. non-privileged user 400 may ask for access to a new service.

This is illustrated by the arrow labelled "Subscriber A is redirected to web server (User Interaction)" on FIG. 10*b*. This step corresponds to step s10 in FIG. 3.

(step 12) ACM function 100 notifies this selection to PCRF 200 via LDAP interface by a Modify Request message (LDAP). The LDAP message contains the data of the user, the services/URLs and quota/access that non-privileged user 400 is requesting to privileged user 500. This is illustrated by the arrow labelled "LDAP Request" on FIG. 10*b*. This step corresponds to step s20 in FIG. 3.

(step 13) PCRF 200 answers this request via LDAP confirming this change (Modify Response in LOAF). This is illustrated by the first arrow labelled "LDAP Answer" on FIG. 10*b*.

(step 14) PCRF 200 sends to privileged user 500 a notification indicating that non-privileged user 400 asked him/her for quota. The notification may be in the form of, for instance, a SMS or HTTP message, depending on the connectivity status of privileged user 500. Further information may be provided as to whether non-privileged user 400 is in roaming. This is illustrated by the arrow labelled "Notify (via SMS or HTTP)" on FIG. 10*b*. This step corresponds to step s30 in FIG. 3.

(step 15) Privileged user 500 ("Subscriber B"), depending on its connectivity status, answers via SMS or logs on to ACM function 100. Privileged user 500 authenticates towards web server. Once logged on, privileged user 500 may attend incoming requests and make a decision as to whether, for instance:
  1 to grant a specific quota;
  2 to grant a specific duration;
  3 to always grant during a time range or time schedule (weekends, 9 pm-8 am Monday-Tuesday, etc.);
  4 to grant always when specific services are concerned.

This step is illustrated by the arrow labelled "Subscriber B authenticates and interacts" on FIG. 10*b*. This step corresponds to step s40 in FIG. 3.

(step 16) ACM function 100 sends this decision towards PCRF 200. This is illustrated by the arrow labelled "LDAP Request (NEW CHARGING PROFILE, PROFILE 2)" on FIG. 10*b*.

(step 17) PCRF 200 acknowledges this request. This is illustrated by the second arrow labelled "LOAF Answer" on FIG. 10*b*.

(step 18) PCRF 200 changes charging profile for non-privileged user 400 in accordance with the newly provided information. Then, PCRF 200 sent those new charging profiles to PCEF 300 via the Gx interface using a RAR message in Diameter protocol. This is illustrated by the arrow labelled "RAR (PCC RULE, CHARGING PROFILE 2)" on FIG. 10*b*.

(step 19) PCEF 300 acknowledges the message sent by PCRF 200 (this is illustrated by the arrow labelled "RAA" on FIG. 10*b*) and installs the new charging profile and the new rating group that has to be applied to non-privileged user 400.

(step 20) PCEF 300 establishes a new credit control session with new rating group. In this case, the new rating group is "rating group 2". This is illustrated by the arrow labelled "CCR Initial (MSISDN A, Rating Group 2)" on FIG. 10b.

(step 21) OCS sends the new quota for this rating group. This is illustrated by the arrow labelled "CCA Initial (Quota)" on FIG. 10b.

(step 22) Non-privileged user 400 is then able to access this service provided that privileged user 500 approved the access. This is illustrated by the arrow labelled "Subscriber A can access to service" on FIG. 10b.

Some advantages of embodiments of the invention are therefore as follows:

The non-privileged users have the chance of quickly accessing the services that are denied to them in accordance with the current policy rules applicable or blocked because they are not having enough credit, Namely, in the context of parental control mechanisms, non-privileged users can access the services that are considered for operators as restricted but allowed for parents. In the context of credit control mechanisms, non-privileged users can consume credit or quickly obtain extra credit from the privileged users of their multiple-user subscription when non-privileged users are running out of credit. The services that are denied for some non-privileged users can be authorized immediately by privileged users when needed. Now, a change of subscription profile can therefore be carried out in a quicker manner and there is no need to have a broker or operator to change the profile.

Figure 11:
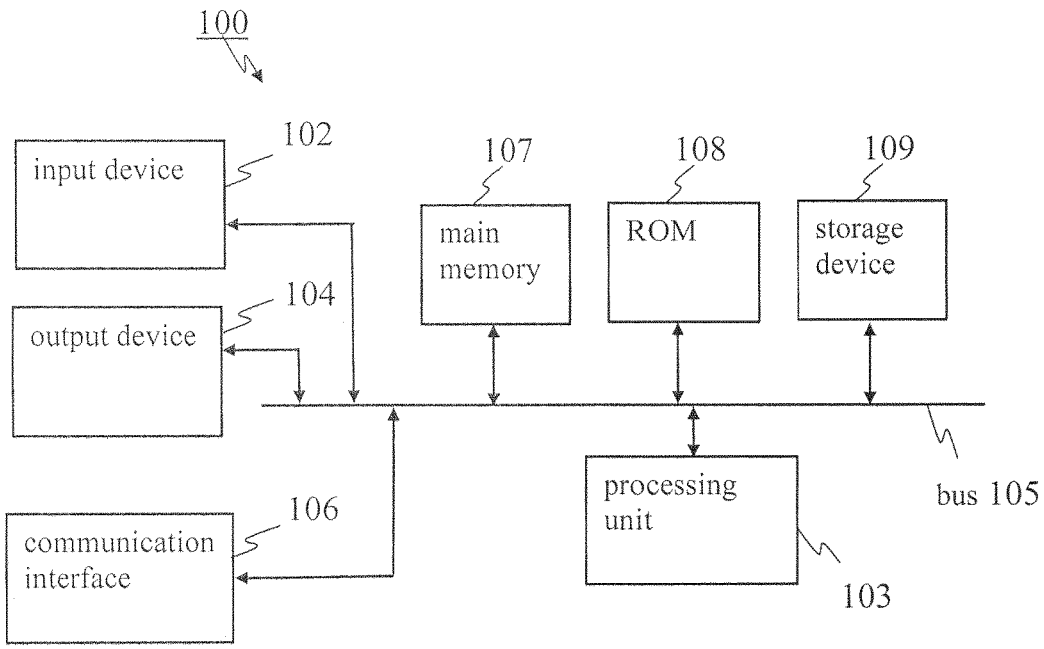
FIG. 11 is a schematic diagram of an exemplary implementation of a network node usable in embodiments of the invention.

FIG. 11 is a schematic diagram of an exemplary implementation of a network node 100 that may host an ACM function usable in embodiments of the invention. As illustrated, network node 100 may include a bus 105, a processing unit 103, a main memory 107, a ROM 108, a storage device 109, an input device 102, an output device 104, and a communication interface 106. Bus 105 may include a path that permits communication among the components network node 100.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator to input information to network node 100, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables network node 100 to communicate with other devices and/or systems (such as with external applications, for instance a PCRF or PCEF). For example, communication interface 106 may include mechanisms for communicating with another device or system via a network.

Network node 100 may perform certain operations or processes described herein. These operations may be performed in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein, such as those characterizing the ACM function. Alternatively, hardwired circuitry may be used in place of or in combination with software instructions to implement processes and/or operations described herein. Thus, implementations described herein are not limited to any specific combination of hardware and software.

Figure 12:
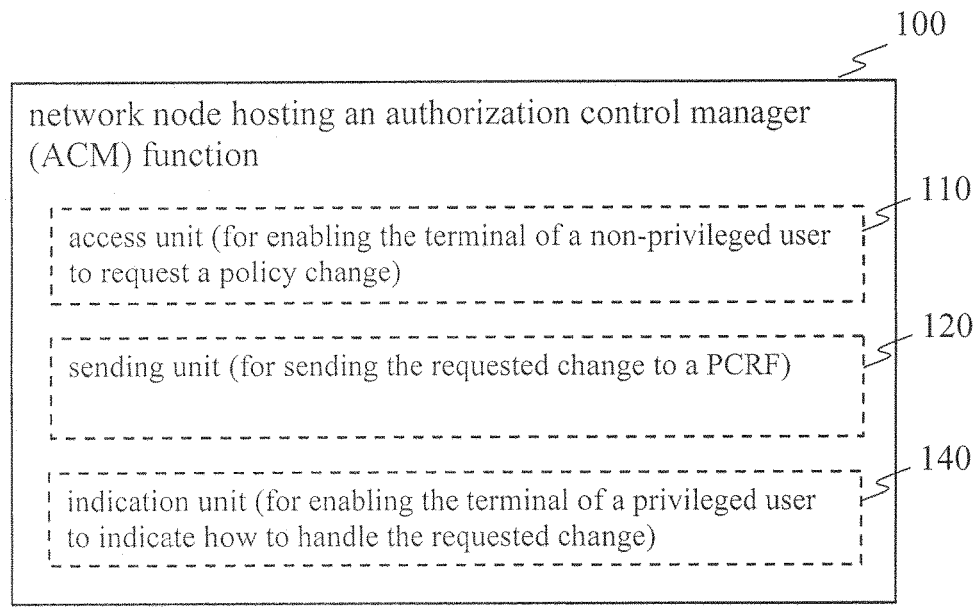
FIG. 12 schematically illustrates a network node hosting an ACM function in one embodiment of the invention.

FIG. 12 schematically illustrates a network node comprising an ACM function 100 in one embodiment of the invention. Such network node may for instance be implemented as illustrated on FIG. 11, Network node 100 comprises: an access unit 110, a sending unit 120, and an indication unit 140. Access unit 110 is configured for enabling a communication terminal of a non-privileged user to access the ACM function to request a change of policy or charging applicable to the non-privileged user. Sending unit 120 is configured for sending to a PCRF the requested change. Indication unit 140 is configured for enabling a communication terminal of the privileged user to indicate to the ACM function, at least one of: whether the requested change is to be granted, and to which extent the requested change is to be granted. Thus, the network node comprising ACM function 100 is configured for participating in enabling the privileged user to cause a change to a policy or charging applicable to the non-privileged user of the same multiple-user subscription. Network node 100 may further host a subscriber profile repository (SPR), so that the ACM function and the SPR are hosted on the same network node.

Figure 13:
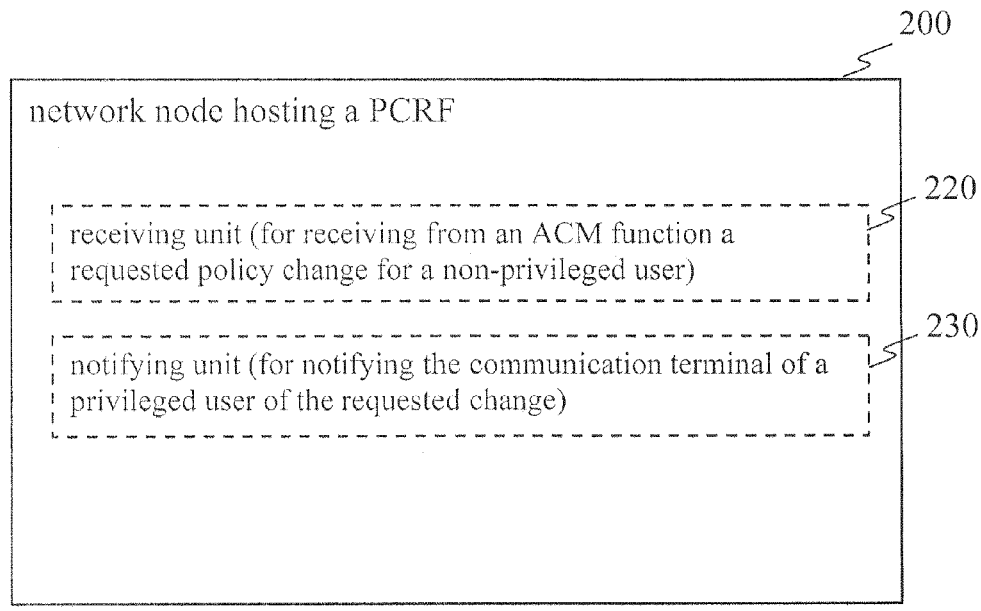
FIG. 13 schematically illustrates a network node hosting a PCRF in one embodiment of the invention.

FIG. 13 schematically illustrates a network node comprising a PCRF 200 in one embodiment of the invention. Such network node may for instance be implemented as illustrated on FIG. 11. Network node 200 comprises: a receiving unit 220 and a notifying unit 230. Receiving unit 220 is configured for receiving, from an ACM function, a requested change of policy or charging applicable to a non-privileged user. Notifying unit 230 is configured for notifying a communication terminal of a privileged user of the requested change. Thus, the network node comprising PCRF 200 is configured for participating in enabling the privileged user to cause a change to a policy or charging applicable to the non-privileged user of the same multi-user subscription.

Figure 14:
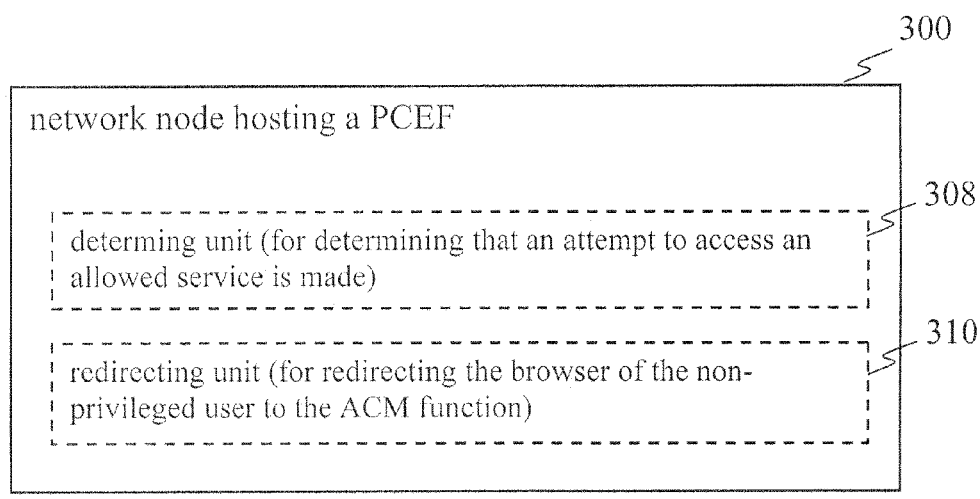
FIG. 14 schematically illustrates a network node hosting a PCEF in one embodiment of the invention.

FIG. 14 schematically illustrates a network node comprising a PCEF 300 in one embodiment of the invention. Such network node may for instance be implemented as illustrated on FIG. 11. Network node 300 comprises: a determining unit 308 and a redirecting unit 310. Determining unit 308 is configured for determining that the communication terminal of the non-privileged user is attempting to access a service or content which, if provided, would violate the policy or charging applicable to the non-privileged user. Redirecting unit 310 is configured for, when the determining unit 308 has determined that the communication terminal of the non-privileged user is attempting to access a service or content which, if provided, would violate the policy or charging applicable to the non-privileged user, redirecting the browser of the communication terminal of the non-privileged user to a URL address of an ACM function. Thus, the network node comprising PCEF 300 is configured for participating in enabling the privileged user to cause a change to a policy or charging applicable to the non-privileged user of the same multi-user subscription.

Where the terms "access unit", "sending unit", "indication unit", "receiving unit", "notifying unit", "determining unit", "redirecting unit", etc. are used herewith, no restriction is made regarding how distributed these elements may be and regarding how gathered elements may be, That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned access unit, sending unit, indication unit, receiving unit, notifying unit, determining unit, redirecting unit, etc. is replaced by access means, sending means, indication means, receiving means, notifying means, determining means, redirecting means, etc. respectively, or by an accesser, a sender, an indicater, a receiver, a notifier, a determiner, a redirecter, etc. respectively, for performing the functions of the access unit, sending unit, indication unit, receiving unit, notifying unit, determining unit, redirecting unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Policy and charging control method for enabling a privileged user of a multiple-user subscription of a telecommunication network to cause a change to a policy or charging applicable to a non-privileged user of the multiple-user subscription, the method comprising:
   accessing, by a communication terminal of the non-privileged user, an authorization control manager function, to request a change of policy or charging applicable to the non-privileged user;
   transmitting, by the authorization control manager function to a policy and charging rules function, hereinafter abbreviated as "PCRF", the requested change;
   notifying a communication terminal of the privileged user, by the PCRF, of the requested change; and
   indicating, by the communication terminal of the privileged user, to the authorization control manager function, at least one of:
   whether the requested change is to be granted, and
   to which extent the requested change is to be granted.

2. Method of claim 1, further comprising, before the step of accessing:
   determining, by a policy and charging enforcement function, hereinafter abbreviated as "PCEF", that the communication terminal of the non-privileged user is attempting to access a service or content which, if provided, would violate the policy or charging applicable to the non-privileged user.

3. Method of claim 2, wherein the step of determining comprises:
   determining that the communication terminal of the non-privileged user is attempting to access web content or service which the non-privileged user is not allowed to access according to the policy applicable to the non-privileged user.

4. Method of claim 2, wherein the step of determining comprises:
   determining that the non-privileged user has insufficient credit to access the service or content.

5. Method according to claim 2, wherein the step of determining comprises inspecting at least one of
   layer n control information of received packets, wherein n is an integer equal to or larger than 3; and
   received packets' payload encapsulated by layer 7 control information;
   wherein the layer level is understood in the sense of the Open Systems Interconnection (OSI) reference model.

6. Method according to claim 2, wherein the step of accessing is triggered by the PCEF redirecting the browser of the communication terminal of the non-privileged user to a uniform resource locator (URL) address of the authorization control manager function.

7. Method according to claim 1, wherein the step of accessing is followed by the authorization control manager function identifying the privileged user who should handle the requested change.

8. Method according to claim 1, wherein
   the step of accessing comprises selecting, by the communication terminal of the non-privileged user, the privileged user who should handle the requested change; and
   the step of accessing is followed by the authorization control manager function identifying the privileged user who should handle the requested change depending on which privileged user has been selected by the communication terminal of the non-privileged user.

9. Method of claim 1, further comprising, before the step of accessing:
   generating, by the PCRF, first policy and charging control, hereinafter abbreviated as "PCC", rules based on session information negotiated between the non-privileged user's communication terminal and an application function, hereinafter abbreviated as "AF", the PCC rules indicating that they apply to a non-privileged user of the multiple-user subscription;
   installing, at establishment or modification of a user plane session associated with the non-privileged user's communication terminal, the first PCC rules at a policy and charging enforcement function, hereinafter abbreviated as "PCEF"; and
   initiating a service associated with the non-privileged user's communication terminal in accordance with the first PCC rules.

10. Method of claim 9, further comprising, after the step of indicating:
- generating, by the PCRF, second PCC rules based on the indication received by the authorization control manager function from the communication terminal of the privileged user;
- installing, at the PCEF, the second PCC rules by replacing the first PCC rules by the second PCC rules; and
- resuming the service associated with the non-privileged user's communication terminal in accordance with the second PCC rules.

11. Method of claim 10, wherein the steps of accessing, transmitting, notifying, indicating, generating, installing, and resuming take place during the lifetime of the user plane session.

12. Method according to claim 1, wherein the authorization control manager function is hosted on a network node hosting a subscriber profile repository, hereinafter abbreviated as "SPR".

13. Method of claim 12, wherein the SPR stores information on whether a user of the multiple-user subscription is a privileged or non-privileged user of the multiple-user subscription.

14. Network node hosting an authorization control manager function for participating in enabling a privileged user of a multiple-user subscription of a telecommunication network to cause a change to a policy or charging applicable to a non-privileged user of the multiple-user subscription, wherein the network node comprises one or more processors operable to:
- enable a communication terminal of the non-privileged user to access the authorization control manager function to request a change of policy or charging applicable to the non-privileged user;
- send to a policy and charging rules function, hereinafter abbreviated as "PCRF", the requested change; and
- enable a communication terminal of the privileged user to indicate to the authorization control manager function, at least one of:
  - whether the requested change is to be granted, and
  - to which extent the requested change is to be granted.

15. Network node of claim 14, further hosting a subscriber profile repository, hereinafter abbreviated as "SPR".

16. Network node hosting a policy and charging rules function, hereinafter abbreviated as "PCRF", for participating in enabling a privileged user of a multiple-user subscription of a telecommunication network to cause a change to a policy or charging applicable to a non-privileged user of the multiple-user subscription, wherein the network node comprises:
- at least one processor; and
- at least one memory that stores processor executable instructions, wherein the at least one processor interfaces with the at least one memory to execute the processor-executable instructions, whereby said network node is operable to:
  - transmit, towards a network node hosting a policy and charging enforcement function, hereinafter abbreviated as "PCEF", first Policy and Charging Control (PCC) rules applicable to the non-privileged user of the multiple-user subscription;
  - receive, from an authorization control manager function, a requested change of policy or charging applicable to the non-privileged user;
  - notify a communication terminal of the privileged user of the requested change;
  - receive, from the authorization control manager function, an indication indicating whether the privileged user has approved the requested change and to what extent;
  - generate second PCC rules based on the received indication; and
  - transmit, towards the network node hosting the PCEF, the second PCC rules to replace the first PCC rules for the non-privileged user.

17. Network node hosting a policy and charging enforcement function, hereinafter abbreviated as "PCEF", for participating in enabling a privileged user of a multiple-user subscription of a telecommunication network to cause a change to a policy or charging applicable to a non-privileged user of the multiple-user subscription, wherein the network node comprises:
- at least one processor; and
- at least one memory that stores processor-executable instructions, wherein the at least one processor interfaces with the at least one memory to execute the processor-executable instructions, whereby said network node is operable to:
  - receive, from a network node hosting a policy and charging rules function, hereinafter abbreviated as "PCRF", first Policy and Charging Control (PCC) rules applicable to the non-privileged user of the multiple-user subscription;
  - determine based on the first PCC rules that the communication terminal of the non-privileged user is attempting to access a service or content which, if provided, would violate the policy or charging applicable to the non-privileged user,
  - upon determining that the communication terminal of the non-privileged user is attempting to access a service or content which, if provided, would violate the policy or charging applicable to the non-privileged user,
  - redirect the browser of the communication terminal of the non-privileged user to a uniform resource locator (URL) address of an authorization control manager function;
  - receive, from the network node hosting the PCRF, second PCC rules to replace the first PCC rules for the non-privileged user, wherein the second PCC rules are based on whether the privileged user has approved a requested change of policy or charging applicable to the non-privileged user and to what extent; and
  - resume, for the non-privileged user, the service in accordance with the second PCC rules.

18. Network node of claim 17, wherein the network node is further configured for determining that the communication terminal of the non-privileged user is attempting to access web content or service which the non-privileged user is not allowed to access according to the policy applicable to the non-privileged user.

19. Network node of claim 17, wherein the network node is further configured for determining that the non-privileged user has insufficient credit to access the service or content.

20. Network node according to claim 17, wherein the network node is such that
- determining that the communication terminal of the non-privileged user is attempting to access a service or content which, if provided, would violate the policy or charging applicable to the non-privileged user comprises:

inspecting at least one of:
- layer n control information of received packets, wherein n is an integer equal to or larger than 3; and
- received packets' payload encapsulated by layer 7 control information;

wherein the layer level is understood in the sense of the Open Systems Interconnection (OSI) reference model.

21. Non-transitory computer readable medium comprising computer-executable instructions configured for, when executed on a network node according to, causing the network node to operate as configured as defined in claim 14.

22. Computer program product comprising non-transitory computer readable medium according to claim 21.

* * * * *